United States Patent
Koch et al.

(10) Patent No.: US 11,544,629 B2
(45) Date of Patent: Jan. 3, 2023

(54) PERSONALIZED MERCHANT SCORING BASED ON VECTORIZATION OF MERCHANT AND CUSTOMER DATA

(71) Applicant: DoorDash, Inc., San Francisco, CA (US)

(72) Inventors: Mitchell Hunter Koch, San Francisco, CA (US); Aamir Manasawala, Berkeley, CA (US); Sohyeon Lee, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 977 days.

(21) Appl. No.: 16/288,796

(22) Filed: Feb. 28, 2019

(65) Prior Publication Data

US 2020/0279191 A1 Sep. 3, 2020

(51) Int. Cl.
| | |
|---|---|
| G06Q 30/02 | (2012.01) |
| G06N 20/20 | (2019.01) |
| G06F 16/2457 | (2019.01) |
| G06Q 10/06 | (2012.01) |
| G06N 5/04 | (2006.01) |

(52) U.S. Cl.
CPC ....... *G06N 20/20* (2019.01); *G06F 16/24578* (2019.01); *G06N 5/04* (2013.01); *G06Q 10/067* (2013.01); *G06Q 30/0255* (2013.01); *G06Q 30/0254* (2013.01)

(58) Field of Classification Search
CPC ...................................... G06Q 30/0207–0277
See application file for complete search history.

(56) References Cited

U.S. PATENT DOCUMENTS

| | | | |
|---|---|---|---|
| 6,430,539 B1 * | 8/2002 | Lazarus | G06Q 30/02 705/14.1 |
| 9,418,343 B2 * | 8/2016 | Chandra | G06N 20/00 |
| 9,665,874 B2 * | 5/2017 | Chau | G06Q 20/209 |
| 10,210,548 B1 * | 2/2019 | Wai | G06Q 30/0247 |
| 10,970,668 B2 | 4/2021 | Han et al. | |
| 11,037,055 B2 | 6/2021 | Han et al. | |
| 11,042,909 B2 * | 6/2021 | Vij | G06K 9/6274 |

(Continued)

OTHER PUBLICATIONS

"Boosting Neural Networks," H Schwenk, Y Bengio—Neural Computation, 2000—MIT Press, 19 pages.

*Primary Examiner* — Kiersten V Summers
(74) *Attorney, Agent, or Firm* — Kwan & Olynick LLP

(57) ABSTRACT

Provided are various mechanisms and processes for generating dynamic merchant scoring predictions. A system is configured to receive datasets comprising pairings between training customer profiles and training merchant profiles. For each pairing, a set of feature values corresponding to features specified by the customer and merchant profiles are extracted and converted into a training vector to train a machine learning model to determine a weighted coefficient for each feature. Once sufficiently trained, the system determines a set of available merchant profiles for a customer profile in response to receiving a search request from a customer associated with the customer profile. For each pairing between the customer profile and an available merchant profile, the system determines an order score for the available merchant based on the weighted coefficients and an input set of feature values specified by the customer profile and the available merchant profile.

20 Claims, 16 Drawing Sheets

(56) References Cited

U.S. PATENT DOCUMENTS

| | | | |
|---|---|---|---|
| 2004/0015386 A1* | 1/2004 | Abe | G06Q 30/0239 705/7.29 |
| 2006/0047617 A1* | 3/2006 | Bacioiu | G06N 3/08 717/124 |
| 2006/0206479 A1* | 9/2006 | Mason | G06Q 30/02 707/999.005 |
| 2007/0186165 A1* | 8/2007 | Maislos | G06Q 30/02 715/728 |
| 2010/0049538 A1* | 2/2010 | Frazer | G06Q 30/0244 705/14.43 |
| 2012/0296724 A1* | 11/2012 | Faro | G06Q 30/00 705/14.27 |
| 2012/0330922 A1* | 12/2012 | Kong | G06F 16/951 707/E17.108 |
| 2014/0136362 A1* | 5/2014 | Shaya | G06Q 30/02 705/26.7 |
| 2014/0279185 A1* | 9/2014 | Merz | G06Q 30/0282 705/26.7 |
| 2015/0006295 A1* | 1/2015 | Liu | G06Q 50/01 705/14.66 |
| 2016/0148258 A1* | 5/2016 | Chavarria | G06Q 30/0261 705/14.53 |
| 2016/0275553 A1* | 9/2016 | Gupta | G06Q 30/0201 |
| 2016/0343056 A1* | 11/2016 | Hu | G06Q 30/0631 |
| 2017/0228777 A1* | 8/2017 | Fischer | G06Q 20/384 |
| 2018/0189859 A1* | 7/2018 | Campos | H04L 63/0815 |
| 2019/0295124 A1 | 9/2019 | Ramesh et al. | |
| 2020/0250700 A1* | 8/2020 | Wai | G06N 20/00 |
| 2021/0019771 A1* | 1/2021 | Parekh | G06N 20/00 |

\* cited by examiner

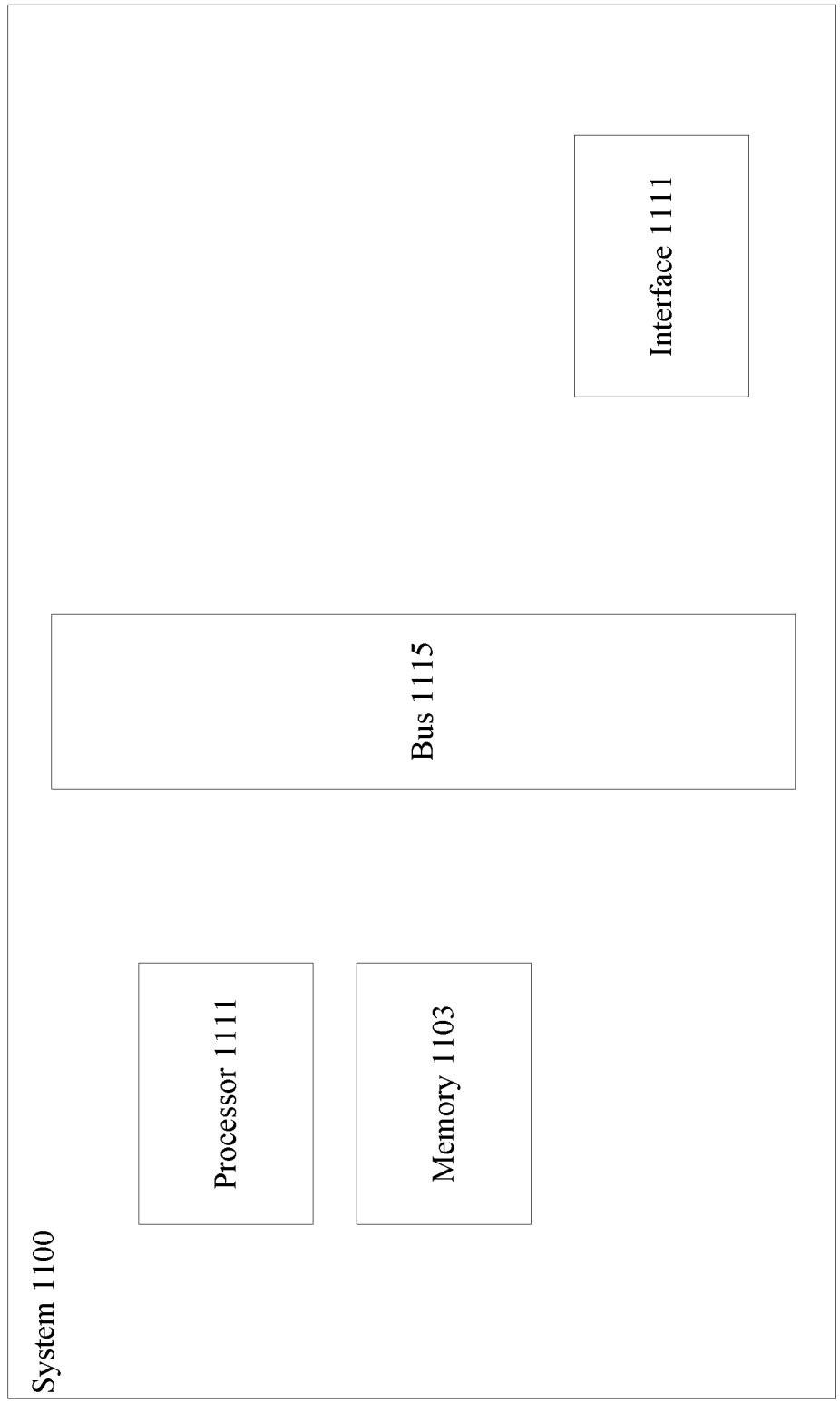

PERSONALIZED MERCHANT SCORING BASED ON VECTORIZATION OF MERCHANT AND CUSTOMER DATA

TECHNICAL FIELD

The present disclosure relates to a system for facilitating a real-time, on-demand deliveries of perishable goods. In one example, the present disclosure relates to mechanisms and processes for scoring merchants that provide perishable goods.

BACKGROUND

Identifying and understanding user preferences is critical to providing personalized experiences to users in online consumer products. In the context of delivery platform, particularly for real-time on-demand deliveries of perishable goods, this involves predicting customer preferences for particular stores or merchants.

Current systems and techniques to identify similar stores include limitations. For example, preferences may be identified by category, such as cuisine type, based on previous customer activity. Preferences may also be identified by the purchase history of consumers, which considers only data corresponding to purchases made. Such techniques are not able to leverage implicit data corresponding to underlying user preferences and merchant characteristics.

Consequently, it is desirable to provide improved mechanisms for providing consumers with meaningful and targeted options in a delivery platform for real-time on-demand delivery of perishable goods.

SUMMARY

Provided are various mechanisms and processes for generating dynamic scoring predictions of merchants for customers. Various embodiments are described for generating dynamic scoring predictions to rank merchants to be provided as recommendations to one or more customers. In one aspect, which may include at least a portion of the subject matter of any of the preceding and/or following examples and aspects, a server system is configured to generate such dynamic merchant ranking predictions.

The server system comprises an interface configured to receive one or more training datasets which include one or more pairings between a plurality of training customer profiles and a plurality of training merchant profiles. The interface is further configured to receive a search request from a first customer device corresponding to a first customer. The search request includes a first customer profile corresponding to the first customer.

The server system further comprises memory configured to store a plurality of customer profiles and a plurality of merchant profiles. The plurality of customer profiles includes the plurality of training customer profiles and the first customer profile, and the plurality of merchant profiles includes the plurality of training merchant profiles.

The server system further comprises a processor associated with a machine learning model. The processor is configured to extract a training set of feature values for each pairing between a training customer profile and a training merchant profile. The training set of feature values corresponds to one or more features specified by the training customer profile and the training merchant profile.

The processor is further configured to convert the training set of feature values into a training vector for each pairing, and input the training vector and a corresponding known output target into the machine learning model to determine a weighted coefficient for each feature of the one or more features. The processor is further configured to dynamically adjust each weighted coefficient for each training vector and corresponding known output target.

In response to receiving the search request, the processor is configured to determine a set of available merchant profiles corresponding to a set of available merchants for the first customer profile, and pair the first customer profile with each available merchant profile. For each pairing of the first customer profile and an available merchant profile, the processor is configured to extract an input set of feature values corresponding to the one or more features specified by the first customer profile and the available merchant profile, and generate a primary order score for the available merchant profile based on the input set of feature values and the weighted coefficients. The processor is further configured to determine a ranking order for each of the available merchant profiles according to corresponding primary order scores, and transmit at least a portion of the set of available merchants to the first customer device for display based on the ranking order.

The processor may be further configured to receive a historical dataset comprising customer activity information characterizing one or more historical browsing sessions generated by the first customer at the first customer device. The historical dataset specifies a first group of merchants that the first customer ordered from and a second group of merchants visited by the first customer.

The processor may be further configured to update the first customer profile with the customer activity information, and generate a new training dataset of the one or more training datasets. The new training dataset comprises one or more pairings between the updated first customer profile and merchant profiles corresponding to the first group of merchants and the second group of merchants. The processor may be further configured to dynamically adjust the weighted coefficients using the new training dataset.

The set of available merchants may be filtered from a global list of merchants based on proximity to a location of the first customer. The set of available may be filtered from a global list of merchants based on tags corresponding to search terms entered by the first customer at the first customer device.

Other implementations of this disclosure include corresponding devices, systems, and computer programs, and associated methods for dynamically predicting merchant rankings. These other implementations may each optionally include one or more of the following features. For instance, provided is a programmable device configured for generating dynamic ranking predictions of merchants using a machine learning model. The programmable device is configured to operate in a training mode and an inference mode.

In the training mode, the programmable device is configured to receive one or more training datasets including one or more pairings between a plurality of training customer profiles and a plurality of training merchant profiles. A training set of feature values is extracted for each pairing between a training customer profile and a training merchant profile. The training set of feature values corresponds to one or more features specified by the training customer profile and the training merchant profile. For each pairing, the training set of feature values are converted into a training vector and input into the machine learning model with a corresponding known output target to determine a weighted coefficient for each feature of the one or more features. Each weighted coefficient is dynamically adjusted for each training vector and corresponding known output target.

In the inference mode, the programmable device is configured to receive a search request from a first customer device corresponding to a first customer. The search request includes a first customer profile corresponding to the first customer. The programmable device is configured to determine a set of available merchant profiles corresponding to a set of available merchants for the first customer profile, and pair the first customer profile with each available merchant profile. For each pairing of the first customer profile and an available merchant profile, the programmable device is configured to extract an input set of feature values corresponding to the one or more features specified by the first customer profile and the available merchant profile, and generate a primary order score for the available merchant profile based on the input set of feature values and the weighted coefficients. The programmable device is further configured to determine a ranking order for each of the available merchant profiles according to corresponding primary order scores, and transmit at least a portion of the set of available merchants to the first customer device for display based on the ranking order.

The programmable device may be further configured to dynamically update the weighted coefficients on an ongoing basis by receiving a historical dataset comprising customer activity information characterizing one or more historical browsing sessions generated by the first customer at the first customer device. The historical dataset specifies a first group of merchants that the first customer ordered from and a second group of merchants visited by the first customer. The programmable device may be further configured to update the first customer profile with the customer activity information, and generate a new training dataset of the one or more training datasets. The new training dataset comprises one or more pairings between the updated first customer profile and merchant profiles corresponding to the first group of merchants and the second group of merchants. The programmable device may be further configured to dynamically adjust the weighted coefficients in the training mode using the new training dataset.

The set of available merchants may be filtered from a global list of merchants based on proximity to a location of the first customer. The set of available may be filtered from a global list of merchants based on tags corresponding to search terms entered by the first customer at the first customer device.

Each training customer profile may correspond to a historical customer, and each training merchant profile may correspond to a historical merchant. The training set of feature values extracted for each pairing between a training customer profile and a training merchant profile includes a combination of one or more of the following: an average price range of merchants visited by the historical customer; an average delivery fee paid by the historical customer; an average item value of the historical merchant; an average delivery time of the historical merchant; and a number of intersecting tags between the training customer profile and the training merchant profile.

The programmable device may be further configured to transmit a request for customer preferences to the first customer device, receive a selection of customer preferences from the first customer device, and assign one or more tags to the first customer profile, the one or more tags corresponding to the selection of customer preferences. For each pairing of the first customer profile and an available merchant profile, the programmable device may be further configured to generate a secondary order score for the available merchant profile based on an amount of intersecting tags between the first customer profile and the available merchant profile. For each pairing of the first customer profile and an available merchant profile, the programmable device may be further configured to combine the primary order score and the secondary order score to generate an updated order score for the available merchant profile.

Each pairing of the first customer profile and an available merchant profile, the primary order score and the secondary order score for the available merchant profile may be weighted based on an amount of orders placed by the first customer in a predetermined time period.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 11 illustrates a particular example of a computer system that can be used with various embodiments of the present disclosure.

DETAILED DESCRIPTION OF PARTICULAR EMBODIMENTS

Figure 1:
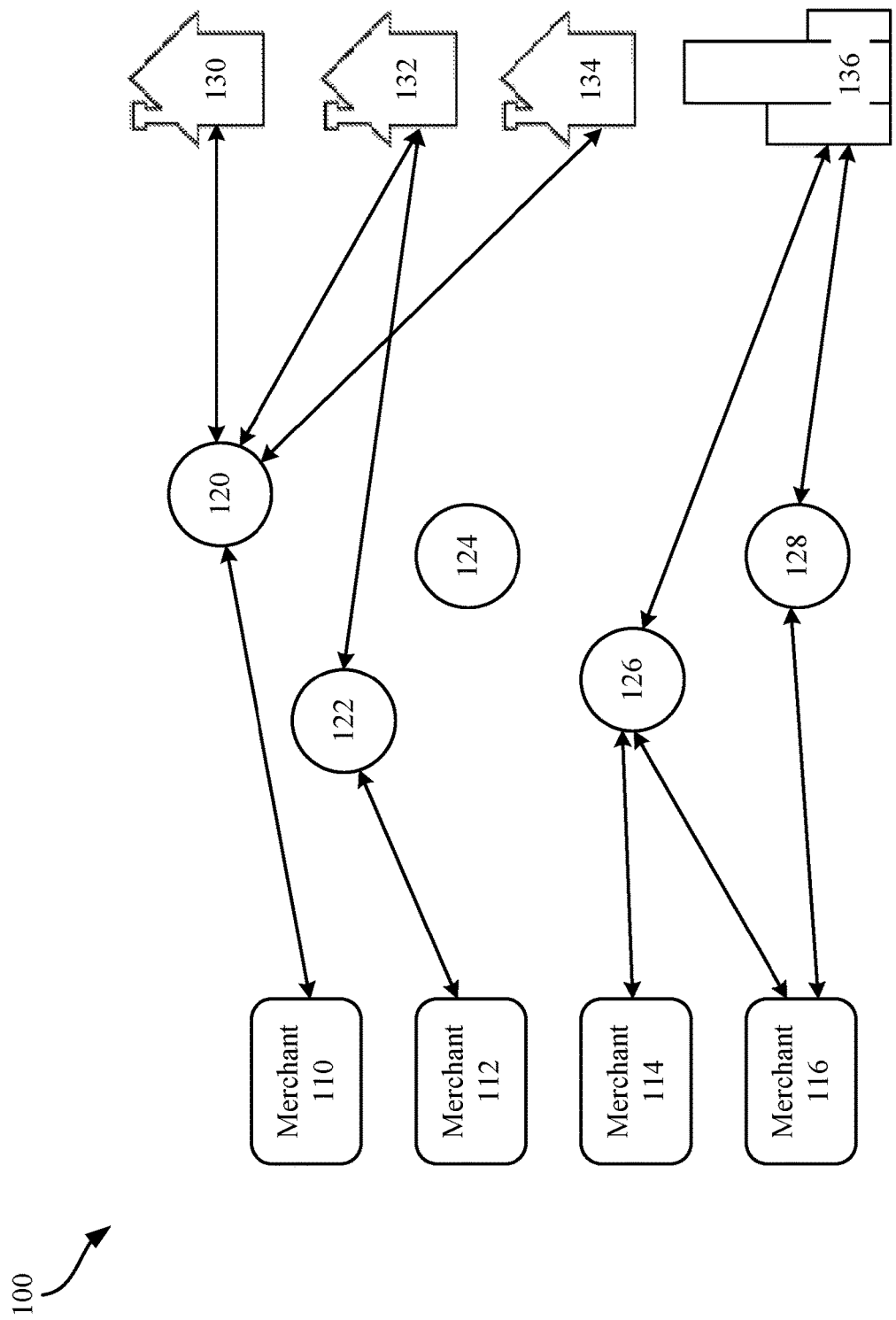
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present disclosure will be described in the context of particular protocols, such as Wi-Fi or Bluetooth. However, it should be noted that the techniques of the present disclosure may also be applied to variations of protocols. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, real-time on-demand deliveries of perishable goods may be requested by various users in a delivery logistics system. Such users may include customers that are browsing merchants, such as restaurants. It may be desired to provide such customers with targeted suggestions of merchants related to search terms and merchants viewed during a browsing session. As used herein, the term "provider" may be used to describe various types of merchants that provide goods, including perishable goods, and the terms "provider" and "merchant" may be used interchangeably. As used herein, the term "delivery associate" may be used to describe a driver or courier that delivers the goods provided by the merchant to a customer, and the terms "delivery associate" and "courier" may be used interchangeably.

Overview

In current systems, merchants may be scored and ranked for a particular customer based on similarity of category, such as cuisine type, price range, etc. However, these existing methods require explicit encoding of data and may not necessarily capture latent user preferences that are implicit in browsing activity. Other methods may include collaborative filtering techniques based on purchases made by customers. However, such techniques may face data sparsity issues problems when applied to a delivery logistics platform focusing on deliveries of orders from local merchants.

According to various embodiments, a delivery logistics system is provided which includes a predictive merchant ranking model for generating scoring predictions for merchants. The system is configured to operate in a training mode to receive training datasets which include pairings between customer profiles and merchant profiles. The training data set may be used as a training corpus to train a predictive model to output scoring predictions based on the relevance of one or more merchants to a particular customer. In example embodiments, the predictive model may comprise a statistical machine learning model and/or a tree-based machine learning model.

For each pairing between a customer profile and the merchant profile, a training set of feature values are extracted. The training set of feature values may correspond to one or more features specified by the paired customer profile and merchant profile. Such features may correspond to customer activity information or other delivery logistics statistics, such as historical browsing sessions or historical order information received from client devices corresponding to customers, merchants, and couriers. The training set of feature values are then converted into a corresponding vector representation. The vector is then input along with corresponding known target outputs into the predictive model to generate weighted coefficients for each feature. Each vector and corresponding target output is used by the predictive model to adjust the weighted coefficients.

Once the predictive model is sufficiently trained, the predictive model may operate in an inference mode to provide accurate scoring predictions for merchants for a given customer. In the inference mode, the delivery logistics system may receive a search request for merchants from a customer device corresponding to a customer. The search request may be generated by a search input by the customer, or by execution of an application on the customer device.

Available merchants may be identified and paired with the customer. For each pairing between the available merchant and the customer, an input set of feature values may be extracted from the corresponding merchant profile and corresponding customer profile. An order score may then be determined based on the input set of feature values and the weighted coefficients determined in the training mode. The order score for a merchant may correspond to the probability that the customer will place an order from the merchant. Additional order models may be implemented to adjust the order score based on other customer activity information or other delivery logistics statistics. For example, customer preferences may be input by the customer and compared with characteristics of a merchant. The merchants may then be transmitted to the customer device to be displayed based on a ranking determined by the order score.

This knowledge-based recommendation system provides a solution to the data sparsity problem presented by a local marketplace in which not every customer can see every merchant, as in typical e-commerce platforms. The features considered by the recommendation model may also take into account latent features between merchants and customers, as well as between merchants and merchants, and functions as a hybrid recommender system with improved predictive capabilities. Various other order models may be implemented to update the order score. For example, the recommendation model may use customer preferences input by the customer to match with available merchants in order to handle cold-start problems presented by new customers or merchants entering the delivery logistics system.

EXAMPLE EMBODIMENTS

With reference to FIG. 1, shown is an example of a delivery logistics system 100 implemented for multiple merchants, couriers, and customers, in accordance with one or more embodiments. As used herein, the term "delivery logistics system" may be used interchangeably with the terms "logistics platform" or "delivery platform." In the present example, the delivery logistics system 100 is managed by a logistics platform for real-time, on-demand, delivery of perishable goods. For instance, a customer may order food from a restaurant by using a mobile device application that places the order through the delivery platform. In some instances, the user may also access the delivery platform through the internet via a computer, laptop, tablet, etc. When the customer orders the food through the delivery platform, the order is prepared at a provider site, where a delivery associate will then pick up the order and deliver the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and delivery platform in the context of restaurants and food delivery, the mechanisms and processes described herein may also be applied to the delivery of various other perishable and non-perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the delivery platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
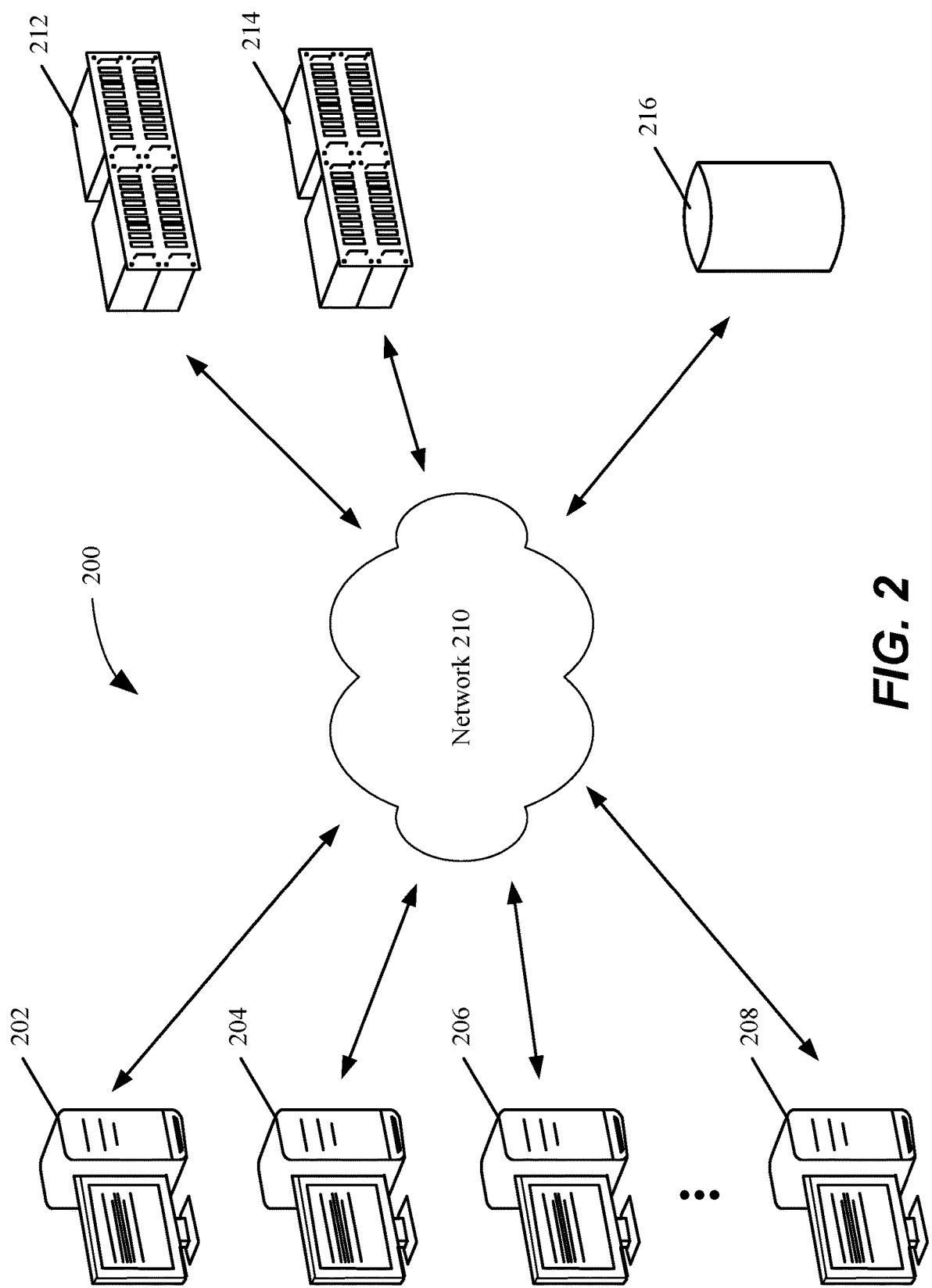
FIG. 2 illustrates a diagram of an example network architecture for implementing various systems and methods of the present disclosure, in accordance with one or more embodiments.

In various embodiments, one or more of the events described herein may be transmitted to client devices corresponding to customers, merchants, or couriers. FIG. 2 illustrates a diagram of an example network architecture 200 for implementing various systems and methods of the present disclosure, in accordance with one or more embodiments. The network architecture 200 includes a number of client devices 202-208 communicably connected to one or more server systems 212 and 214 by a network 210. In some embodiments, server systems 212 and 214 include one or more processors and memory. The processors of server systems 212 and 214 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 212 is a content server configured to receive and store network profile information. In some embodiments server system 214 is a dispatch server configured to transmit and/or route network data packets including network messages. In some embodiments, content server 210 and dispatch server 212 are configured as a single server system that is configured to perform the operations of both servers.

In some embodiments, the network architecture 200 may further include a database 216 communicably connected to client devices 202-208 and server systems 212 and 214 via network 210. In some embodiments, network data, or other information such as user information, courier information, and merchant information, may be stored in and/or retrieved from database 216.

Users of the client devices 202-208 access the server system 212 to participate in a network data exchange service. For example, the client devices 202-208 can execute web browser applications that can be used to access the network data exchange service. In another example, the client devices 202-208 can execute software applications that are specific to the network (e.g., networking data exchange "apps" running on smartphones).

Users interacting with the client devices 202-208 can participate in the network data exchange service provided by the server system 212 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 212. For example, the user may post a review of a restaurant to a restaurant review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 202-208 can be computing devices such as laptop or desktop computers, smartphones, personal digital assistants, portable media players, tablet computers, or other appropriate computing devices that can be used to communicate with an electronic social network. In some implementations, the server system 212 can include one or more computing devices such as a computer server. In various embodiments, each of client devices 202-208 may be any one of merchant devices corresponding to merchants 110-116, courier devices corresponding to couriers 120-128, or customer devices corresponding to customers 130-136.

In some implementations, the server system 212 can represent more than one computing device working together to perform the actions of a server computer (e.g., cloud computing). In some implementations, the network 210 can be a public communication network (e.g., the Internet, cellular data network, dial up modems over a telephone network) or a private communications network (e.g., private LAN, leased lines).

Various customers, merchants, and couriers may transmit and receive information related to one or more orders to the servers 212 or 214 via corresponding client devices. The system may then utilize information received from various devices to calculate the ETA of the delivery of the order, as well as dynamically updating the ETA when updated timestamps are received. The predicted ETAs may further be used by a delivery routing system for pairing orders to couriers and merchants for delivery. Such information may include order information, payment information, activity updates, timestamps, location information, or other appropriate electronic information. For example, a selection of one or more merchants may be received from a customer device with a request to view available items for order. Information corresponding to the selected merchants may be retrieved from database 216 and transmitted to the customer device.

Figure 3:
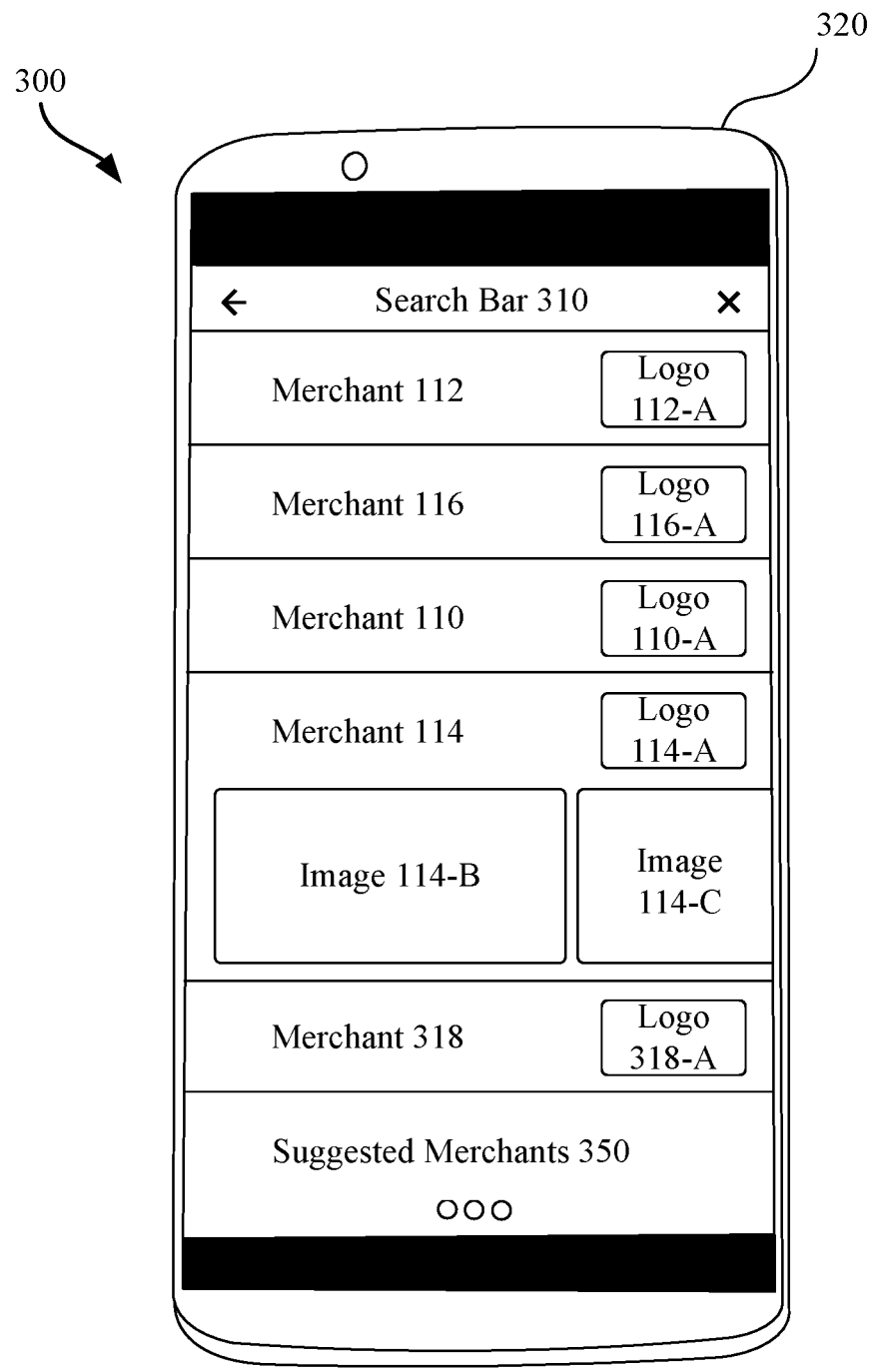
FIG. 3 illustrates an example of a user interface on a client device corresponding to a customer, in accordance with one or more embodiments.

With reference to FIG. 3, shown is an example user interface 300 on a client device corresponding to a customer, in accordance with one or more embodiments. In some embodiments, client device 320 may be a customer device corresponding to any one of customers 130-136. In various embodiments, interface 300 includes search bar 310. A customer may begin a browsing session by inputting search terms in search bar 310 to retrieve merchant information relating to the search terms. For example, a customer may input a type of food, such as Mexican, Japanese, lunch, dinner, spicy, etc., to retrieve merchants or restaurants that serve items relating to the particular search term. As another example, a customer may input the name of a particular merchant. In various embodiments, the customer may enter various other search criteria, such as location, search radius, hours of operation, etc.

Based on the input search terms, various merchants may be retrieved and presented in interface 300. As illustrated in FIG. 3, the search results are displayed as a list of merchants is displayed. The search results include merchants 110, 112, 114, 116, and 318. In the present example, the list of merchants may correspond to restaurants, bars, cafes, or other vendors of food or beverages that relate to the search terms. In some embodiments, the list of merchants may be ordered based on various criteria, such as merchant rating, relative distance from the device or address, price point, etc. In some embodiments, results may be ordered based on relevance to the search terms. In some embodiments, results are ordered for a particular customer based on customer profile information and activity of that particular customer. Various systems and methods for determining relevance of merchants for generating search results and ordering such results are further described below.

In various embodiments, the search results may include additional information for each result, such as merchant logos. As shown, logo 110-A, 112-A, 114-A, 116-A, and 318-A are displayed within corresponding merchants 110, 112, 114, 116, and 318, respectively. In some embodiments, search results may display images, such as images 114-B and 114-C corresponding to merchant 114. Such images may include images of various order items, the merchant storefront or interior, or other relevant content. The search results may further include additional information, such as distance from the device, merchant rating, estimated delivery time, etc.

The customer may then select any one of the merchants provided in the search results to retrieve information for the selected merchant, including available items, order information, additional images, etc. In a particular browsing session, a customer may return to the search results or input additional terms in search bar 310 to select one or more merchants before selecting items and placing an order.

In some embodiments, interface 300 includes a suggested merchant section 350. In various embodiments, suggested merchant section 350 includes a list of one or more suggested merchants based on the search terms. In some embodiments, suggested merchant section 350 includes a list of one or more suggested merchants based on merchant selections by a customer during the particular browsing session. The suggested merchants may be targeted to the particular customer. Various systems and methods for determining associated merchants are further described below.

Figure 4:
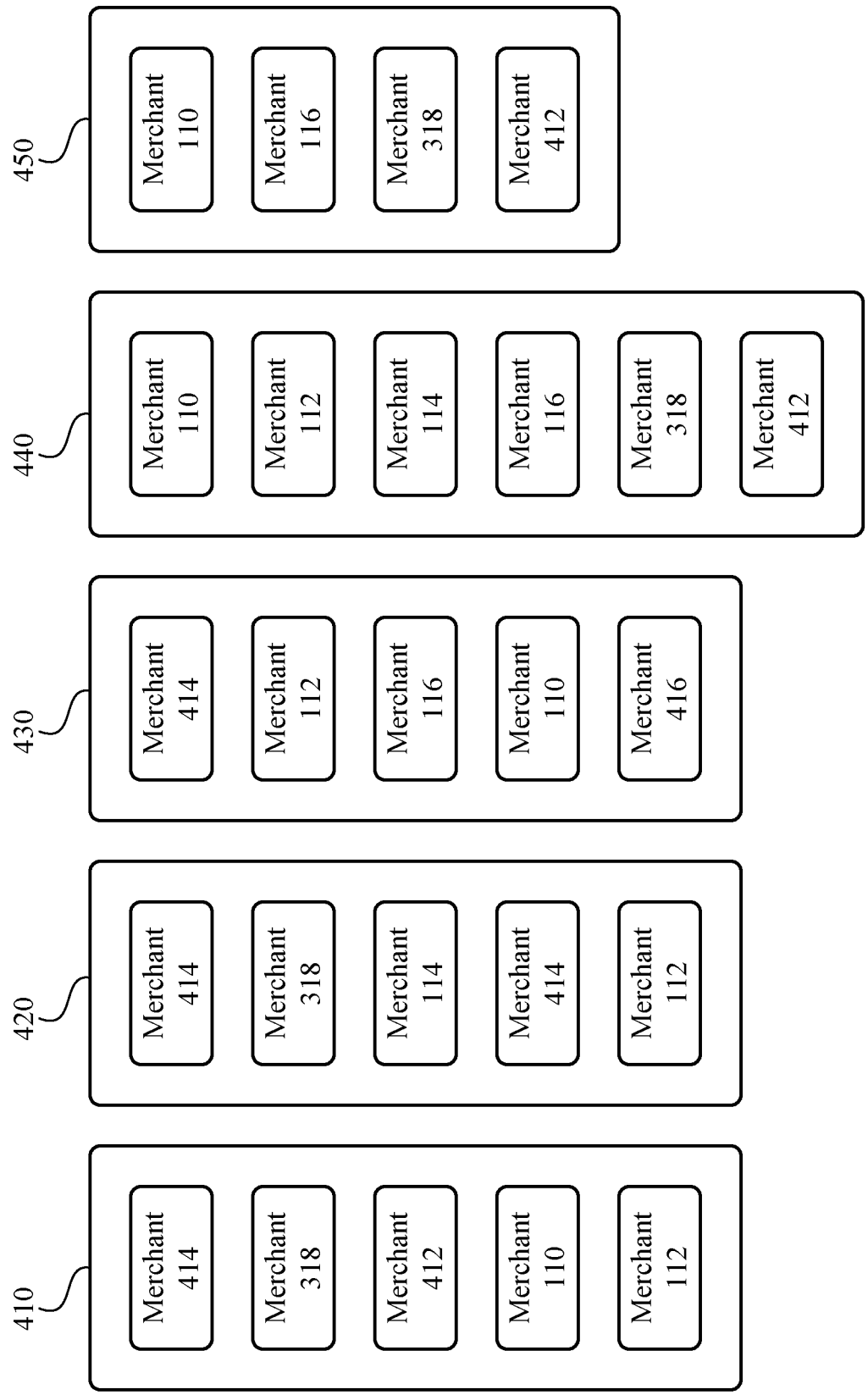
FIG. 4 illustrates an example of browsing sessions by one or more customers, in accordance with one or more embodiments.

With reference to FIG. 4, shown is an example of browsing sessions by one or more customers, in accordance with one or more embodiments. Illustrated are five browsing sessions, session 410, 420, 430, 440, and 450. For example, a customer using an interface 300, may input search results and create browsing session 410 by selecting merchants 414, 318, 412, 110, and 112. Browsing session 420 includes selection of merchants 414, 318, 114, 414, and 112. Browsing session 430 includes selection of merchants 414, 112, 116, 110, and 416. Browsing session 440 includes selection of merchants 110, 112, 114, 116, 318, and 412. Browsing session 450 includes selection of merchants 110, 116, 318, and 412.

The illustrated browsing sessions in FIG. 4 may be generated by one or more different customers and are exemplary browsing sessions for explanatory purposes. It should be recognized that browsing sessions may include a fewer or greater number of merchant selections. In some embodiments, more than one instance of the same restaurant may be recorded for a browsing session if the restaurant is selected multiple times. For example, a customer may have browsed merchant 414 twice in browsing session 420 which includes two instances of merchant 414. The order that each merchant is browsed or visited by the customer may be tracked in each browsing session. Each browsing session may be referred to as a historical browsing session and stored at delivery logistics system 100, such as in storage 216. Such browsing sessions may be referred to as historical browsing session. Browsing sessions may further include various other customer activity information, including items selected or viewed by the customer, items added to a shopping cart, items removed from a shopping cart, search terms input by the customer, unselected merchants that were presented to the customer, etc.

In some embodiments, a historical browsing session may be stored after the browsing session ends. A browsing session may end after the customer selects items from a particular merchant and places the order. In other embodiments, a browsing session may end when the customer closes the user interface 300. In some embodiments, certain requirements must be met before a browsing session is stored as a historical browsing session. For example, only browsing sessions in which an order is placed may be stored. As another example, a predetermined minimum number of merchant selections by a customer during the browsing session may be required before the browsing session is stored as a historical browsing session. In yet another example, only merchants that have been viewed by a predetermined minimum number of customers may count toward the minimum number of merchant selections in a particular browsing session.

In some embodiments, a historical browsing session may correspond to one or more merchants selected, viewed, or searched for by the customer via other sources, such as a link to the merchants transmitted to the customer via text, email, or other application. In some embodiments, such historical browsing sessions may be combined and stored as a single historical browsing session. In some embodiments, such historical browsing sessions may be grouped by the sources through which the customer selected, viewed, or searched for the merchants.

Figure 5A:
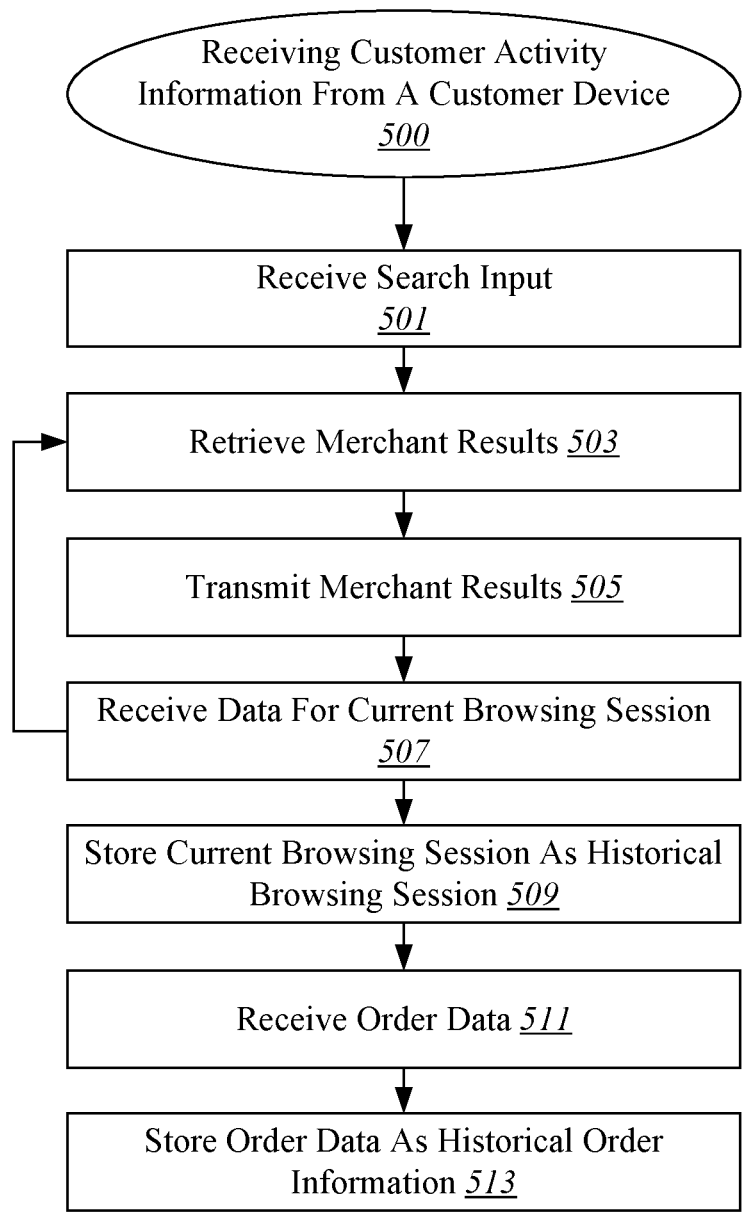
FIG. 5A illustrates an example process for receiving customer activity information from a customer device, in accordance with one or more embodiments.

FIG. 5A depicts an example flow chart of an example process 500 for receiving customer activity information from a customer device, in accordance with one or more embodiments. Such customer activity information may include browsing session information, as well as order information and onboarding information. The customer activity information may be transmitted via network 210. At 501, a search input is received. In some embodiments, the search input may be transmitted from a customer device when an application is executed or initiated on the customer device. In some embodiments, a customer may begin a current browsing session by inputting search terms into a user interface, such as in search bar 310 of user interface 300. In some embodiments the search input may include one or more search terms entered into search bar 310 by a customer in a user interface such as interface 300 on a corresponding customer device, such as 202-208. In some embodiments, the search input may be placed in a web browser or an application installed in the customer device.

In some embodiments, the search input may include location information corresponding to the location for delivery of the order. For example, the location of the customer device may be determined via GPS. As another example, the location information may include an address corresponding to the customer. The search input may further include additional information, such as order items, payment information, and other customer information.

At 503, merchant results are retrieved. In some embodiments, merchant results are retrieved from system storage, such as storage 216. As previously described, merchant results may be retrieved based on the search input, including location, food type, item type, merchant rating, etc. In various embodiments, merchants results may be identified and scored using systems and methods described herein. At 505, merchant results are transmitted to the customer device. In some embodiments, the merchant results are displayed as a list of merchants. As previously described, the list may be ranked or ordered based on various criteria, such as merchant rating, relative distance from the device or address, price point, etc. In some embodiments, results may be ordered based on relevance to the search terms or to the customer.

At 507, the browsing data of the current browsing session is received. During the current browsing session, the customer may select one or more merchants and/or items to view additional information, such as ingredients, pricing, and photos. The browsing data of a particular browsing session may include various types of data including selected merchant information, items viewed, items ordered, search terms, etc. At 509, the current browsing session is stored as a historical browsing session. The historical browsing session may be associated with a customer profile corresponding to the customer. As previously described, the current browsing session may only be saved as a historical browsing session if certain requirements are met, such as a minimum number of merchants selected.

At 511, order data is received from the customer. The customer may place an order for selected items from a selected merchant from the current browsing session. The order data may include various information about the order, such as order items, number of items, total price of the order, as well as other relevant information regarding the restaurant and delivery route for the order. The order and order data may be transmitted to the selected merchant and delivery routing information may be provided to a courier. The order data may then be stored as historical order information at 513. Such historical order information may be associated with a customer profile corresponding to the customer. The historical order information may be associated with a merchant profile corresponding to the merchant.

In some embodiments, the customer activity information may be used by a delivery logistics system to determine more relevant search results or recommendations to the customer in subsequent browsing sessions or customer communications. For example, in some embodiments, the data of the current browsing session received at 507 may be used to determine additional related search results at 503 in the current browsing session or in subsequent browsing sessions. Similarly, historical browsing sessions and/or historical order information may be used to determine additional related search results. In some embodiments, a delivery logistics system uses a predictive machine learning model to dynamically generate predictions of relevant merchants that are associated with the browsing activity of the current session by the current customer, as further described below. Such merchant predictions may be transmitted to the customer device at 505 as additional updated search results. In some embodiments, such merchant predictions may be displayed at the customer device as suggested merchants 350 previously described.

In various embodiments, the merchants included in stored historical browsing sessions, such as those received and stored via method 500, may be used to train a predictive model for generating probabilities of association between each merchant. In some embodiments, the predictive model may be a predictive merchant ranking model with one or more various machine learning processes. In various embodiments, the information from historical browsing sessions are converted into corresponding vector representations and input into one or more computational layers of the predictive model to generate order or ranking scores for available merchants.

Figure 5B:
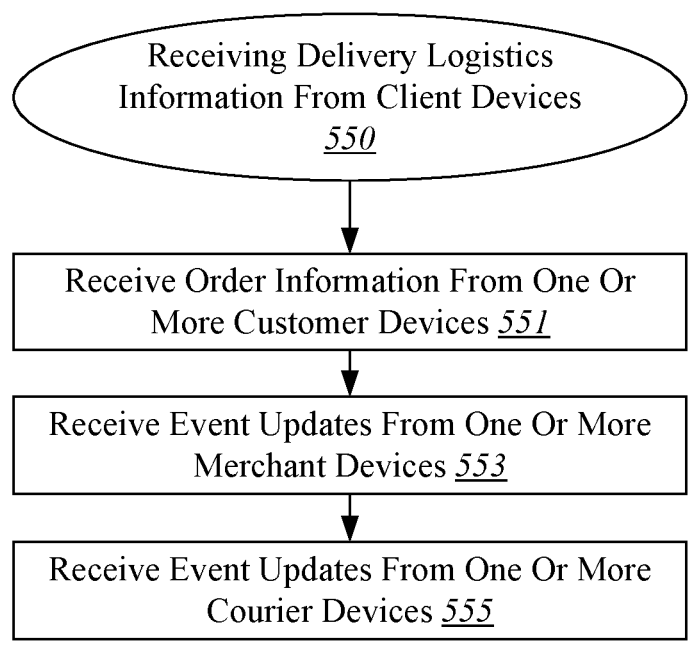
FIG. 5B illustrates an example process for receiving delivery logistics information from client devices, in accordance with one or more embodiments.

FIG. 5B depicts an example process 550 for receiving delivery logistics information from client devices, in accordance with one or more embodiments. Such client devices may correspond to a combination of one or more of customer devices, merchant devices, and courier devices. At 551, order information is received from one or more customer devices. Such order information may include order data received at operation 511 or historical order information stored at operation 513. In various embodiments, the order information may be aggregated and associated with corresponding merchant profiles and customer profiles in a database, such as database 216. For example, the order information for an order placed by a customer from a merchant may be stored and associated with a merchant identification (ID) code corresponding to the merchant and a customer ID code corresponding to the customer. As such, various customer statistics may be derived, such as characteristics of merchants visited by the customer and merchants that the customer ordered from, including restaurant types, cuisine types, price ranges, number of order items, amount spent, and delivery fees paid. Such information may also be used to derive various delivery logistics statistics, such as total sales, items ordered, number of visits, etc.

Various delivery logistics statistics may also be received by the system from merchant devices and courier devices. At 553, event updates are received from one or more merchant devices. In various embodiments, event updates received from a merchant device may include the receipt of the order placement, confirmation of the order, completion of the order items, and order pickup by a courier. Other event updates may be additionally, and/or alternatively, received from one or more courier devices at 555. In various embodiments, event updates received from a courier device may include pairing of a delivery to a courier, arrival of the courier at the merchant location, order pickup by the courier, and delivery of the order to the customers. Various other delivery events may be tracked and received from merchant and courier devices. Various delivery events are further described in U.S. patent application Ser. No. 16/191,998 by Han et al., filed on Nov. 15, 2018, titled DEPOT DISPATCH PROTOCOL FOR AUTONOMOUS LAST-MILE DELIVERIES, which application is incorporated by reference herein in their entirety and for all purposes.

Various delivery logistics statistics may be extrapolated from such information, such as average item value at the merchant, average preparation time of the merchant, average delivery time for the merchant, total number of orders within a given time period, etc. The customer activity information and delivery logistics information received at processes 500 and 550 may be used to determine scores for ranking search results of merchants displayed at a customer device.

Figure 6:
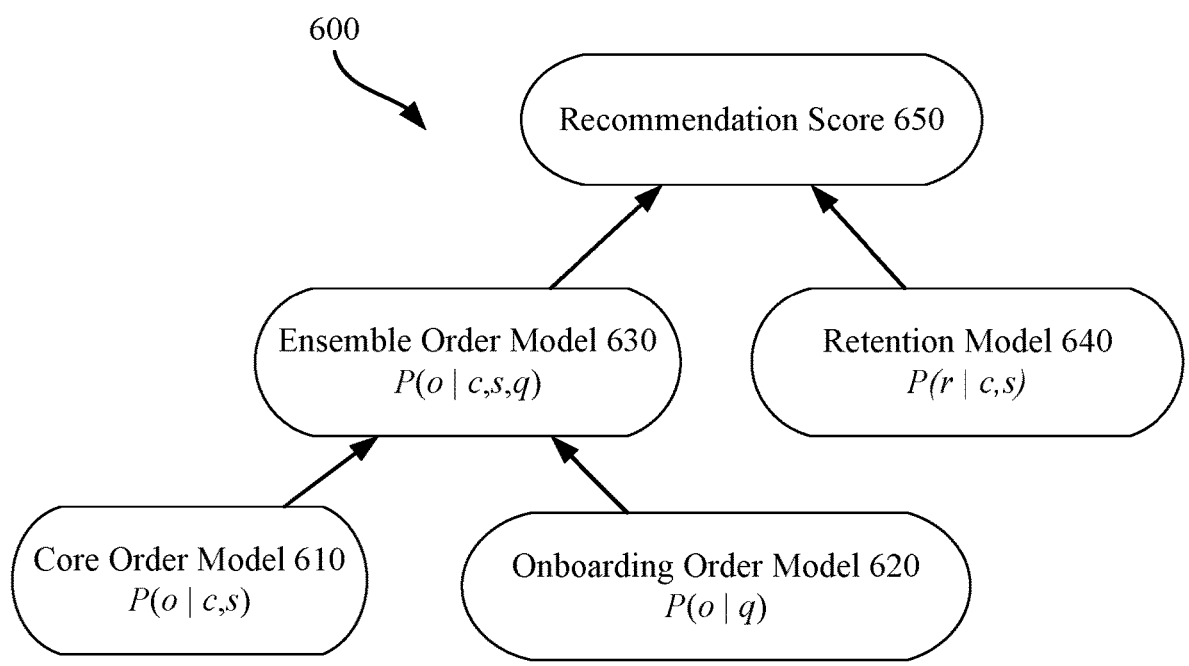
FIG. 6 illustrates example merchant recommendation model for determining merchant rankings for display on a user interface for a particular customer, in accordance with one or more embodiments.

With reference to FIG. 6, shown is an example merchant recommendation model 600 for determining merchant rankings for display on a user interface for a particular customer, in accordance with one or more embodiments. Merchant recommendation model 600 may be a predictive merchant ranking model implemented within a delivery logistics system. Merchant recommendation model 600 comprises core order model 610, onboarding order model 620, ensemble order model 630, retention model 640, and recommendation score model 650.

Core Order Model

Core order model 610 may determine a ranking score or order score for various available merchants for a particular customer. As used herein, the "ranking score" or "order score" determined by core order model 610 may be referred to as "core order score." Core order model 610 may be a machine learning model. In some embodiments, the machine learning model may be associated with one or more layers of a neural network. For each available merchant, the core order model may input various features related to the particular customer and the available merchant to output the core order score, $P(o|c, s)$, of the available merchant for the particular customer. Such features may include customer features, merchant features, and pair features, further described below. The features described herein are provided as illustrative examples and are not meant to be limiting. It should be recognized that various other features relating to customer activity information, customer statistics, and delivery logistics statistics may be implemented in the merchant recommendation model.

In some embodiments, the various features may include various customer features related to or derived from customer activity information. Such customer features may be received from or determined from information received from a customer device, such as described in process 500. In some embodiments, customer features may correspond to characteristics of merchants that the customer has previously visited, or in other words selected and/or browsed. Such customer features may include the average price range of previous merchants the customer has visited (price_range_visits). In some embodiments, merchants are grouped into categories corresponding to price ranges. In some embodiments, the price ranges correspond to the average or expected price paid by a customer per visit. For example, price ranges may include $0-$9.99, $10-$24.99, $25-$64.99, $65-$99.99, and $100 and above. Various other price ranges or methods of determining price ranges for merchants may be implemented in other embodiments. For example, a merchant may be categorized into a price range based on the average price of items on its menu. In some embodiments, the merchant may be categorized into a price range based on the average price of main dishes on its menu. In some embodiments, the average price range of previously visited merchants may be averaged and a tag corresponding to the price range may be associated with the customer profile corresponding to the customer. In some embodiments, price_range_visits value corresponds to whether price range of the merchant matches the price range tag of the customer.

Such customer features may also include the average delivery fee of merchants the customer has visited (delivery fee visits). For example, the delivery fee of merchants a customer has visited in a predetermined period may be averaged. The delivery_fee_visits value may then correspond to the difference between the delivery fee of a merchant and the average delivery fee calculated for the customer. In other embodiments, the delivery_fee_visits value may be normalized to a value between 0 and 1.

In some embodiments, customer features may correspond to characteristics of merchants that the customer has previously ordered from. Such customer features may include the percentage of merchants the consumer has ordered from that are classified as chain restaurants (chain_affinity). The chain_affinity value may be smoothed using additive smoothing. Other such customer features may include the average delivery fee the customer has paid for previous orders (delivery_fee_delivery).

In some embodiments, the values of one or more various customer features may be determined for a predetermined number of previous orders, such as for the previous ten orders. In some embodiments, the values of the various customer features may be determined for orders placed within a predetermined period of time, such as orders placed within the last 28 days.

In some embodiments, the various features may additionally, or alternatively, include merchant features related to delivery logistics statistics of merchants. Such delivery logistics statistics may be received from or determined from information received from client devices, such as described in process 550. Various merchant features may also be from merchant devices upon registration or onboarding of the merchant onto the delivery logistics platform.

In some embodiments, merchant features include the average item value (AIV) for the merchant (store_aiv). In some embodiments, merchant features include the average delivery time for the merchant (store_avg_delivery_seconds). This value may be measured in seconds. In some embodiments, the store_avg_delivery_seconds may correspond to the average time for an order to be successfully delivered after the order is received and confirmed by the merchant.

In some embodiments, merchant features may include an estimated total time for preparation of an order and delivery of the order once the order is placed (store_list_asap). In some embodiments store_list_asap may correspond to an estimated total time (ASAP time) that is listed in a merchant profile during a browsing session on a customer device. In some embodiments, the ASAP time may be personalized for the particular customer corresponding to the customer device based on various factors, such as location, time of day, traffic conditions, etc. Various systems and methods for generating dynamic estimated time of arrival (ETA) predictive updates for real-time delivery of perishable goods are further described in U.S. patent application Ser. No. 15/798,207 by Han et al., filed on Oct. 30, 2017, titled SYSTEM FOR DYNAMIC ESTIMATED TIME OF ARRIVAL PREDICTIVE UPDATES, which is incorporated by reference herein in its entirety and for all purposes. In some embodiments, the store_list_asap value may be normalized using a polynomial regression based on historical data including past deliveries or orders, and corresponding ASAP times, such that the store_list_asap value represents a probability of an order placement given a particular ASAP time.

In some embodiments, merchant features include the percent of orders in the market coming from the merchant (store_popularity_pct). In some embodiments, the orders in the market may correspond to orders from merchants in a particular geographical area. In some embodiments, merchant features include a score for the merchant profile (store_profile_score). For example, the store_profile_score value may depend on how many photos of menu items exist for a particular merchant profile. Thus, the store_profile_score may correspond to the percentage of menu items that include photos in a particular merchant profile. As another example, store_profile_score may depend, at least in part, on the description of menu items in a merchant profile, or the completeness of a merchant profile, such as whether all menu items include prices.

In some embodiments, merchant features include whether there been no orders to the merchant within a predetermined period of time, such as 28 days (store_no_recent_orders). For example, if orders have not been placed for a merchant in the past 28 days, a larger value may be assigned the merchant's store_no_recent_orders feature in order to increase the merchant's ranking score. In some embodiments, the store_no_recent_orders value is determined by the number of days beyond 28 days in which no orders have been placed.

In some embodiments, merchant features may include the delivery fee scaled to a number between 0 and 1 (delivery_fee_adjusted). For example, the delivery fee of all merchants may be scaled such that the highest delivery fee value among the merchants corresponds with the value 1. The delivery fee of a particular merchant may then be divided by the highest delivery fee value to determine the scaled delivery fee between 0 and 1. In some embodiments, merchant features include whether there is a partnership agreement with the merchant (store_is_partner). In some embodiments, the store_is_partner feature of a merchant may be given a binary value of 1 if a partnership agreement exists, or 0 If a partnership agreement does not exist.

In some embodiments, merchant features include a position score of the merchant (store_position_score). The store_position_score feature value may correspond to historical browsing session data indicating whether a particular merchant was selected. The selection of the particular merchant may then be weighted based on the listed position of the particular merchant when the merchant was selected. Thus, if a merchant was selected when displayed at a lower position in a particular browsing session, such selection may be given a larger weight than if the merchant was selected when displayed at a higher position in a browsing session.

One or more of such merchant features may be determined for a predetermined number of previous orders, such as for the previous 100 orders. In some embodiments, the values of the various merchant features may be determined for information within a predetermined period of time, such as within the last 28 days.

In some embodiments, the various features may include pair features corresponding to the relationship between the available merchant and the particular customer. Such pair features may be received from or determined from information received from client devices, such as described in process 550. Pair features may relate to various tags associated with customer profiles and merchant profiles.

For example, each customer and merchant may have a merchant profile stored in the delivery logistics platform. Each customer and merchant profile may be associated with a number of tags. Each merchant profile may include various information and data of the corresponding merchant, including tags indicating various characteristics of the merchant, such as the cuisine type, price range, etc. There may be any number of such categories of tags. Each customer profile may include tags based on customer activity information, historical browsing sessions, and historical order information. Various tags may also be received from client devices upon registration or onboarding of the merchant or customer onto the delivery logistics platform.

Cuisine type tags may denote the ethnic background of the food, such as Mexican, Chinese, Japanese, etc. Cuisine type tags may also denote the type of meal, such as breakfast, lunch, brunch, dinner, cocktails, etc. In some embodiments, certain tags may be classified as a primary (first) tag, secondary (second) tag, tertiary (third) tag, etc. For example, ethnic cuisine type tags may be classified as primary tags, meal types (breakfast, lunch, etc. may be classified as secondary types. In some embodiments, tags may be classified for a merchant based on relevance. For example, a merchant may be associated with more than one cuisine type tag, such as Japanese and Brazilian. If Brazilian cuisine is more relevant to the merchant, then the corresponding tag may be classified as a primary tag. In other embodiments, particular categories of tags are given predetermined classifications. For example, cuisine type tags may be classified as primary tags, and dietary restriction tags may be classified as secondary tags.

In some embodiments, pair features include the number or ratio of intersections between tags associated with the merchant profile and tags associated with the customer profile. The tags associated with the customer profile may be tags corresponding to searches that the customer has performed in a predetermined number of historical browsing sessions or within a predetermined time period. The tags associated with the customer profile may be tags corresponding to tags of merchants that the customer has visited and/or ordered from in a predetermined number of historical browsing sessions or within a predetermined time period. In some embodiments, the number or ratio of intersections may correspond to the total number of intersections within the sets of tags in the customer profile and the merchant profile. In some embodiments, the number or ratio of intersections may correspond to a non-set value of intersections.

For example, a pair feature considered may be the ratio of set tag intersections between the merchant and the merchants visited by the customer in browsing sessions within a predetermined period of time, such as 28 days (ratio_intersect_tags_visits). The customer may have visited three Mexican restaurants and two Japanese restaurants in the past 28 days, and the corresponding customer profile may be associated with five tags with three tags for Mexican cuisine type and two tags for Japanese cuisine type. A merchant with a tag corresponding to Mexican cuisine type results in three total set intersections and may be given a ratio_intersect_tags_visit value of 3/5.

As another example, a pair feature considered may be the ratio of non-set tag intersections between the merchant and the merchants visited by the customer in browsing sessions within a predetermined period of time, such as within the prior 28 days (ratio_intersect_tags_visits_nonset). In the above example, the customer profile would be associated with two tags, one for Mexican cuisine type and one for Japanese cuisine type. Thus, a merchant with a tag corresponding to Mexican cuisine type would result in one total non-set intersection and may be given a ratio_intersect_tags_visit_nonset value of 1/2.

Various other such pair features may correspond to the intersections of only primary tags, secondary tags, tertiary tags, and so on. In some embodiments, pair features may correspond to the intersections of all available tags. In some embodiments, pair features may correspond to the intersections of tags within a particular category.

In some embodiments, pair features may include an estimate of probability that the customer will order from the primary category of the merchant based on the merchants previously ordered from by the customer (p_primary_category_v0). This may be calculated based on additive smoothing as: (1+num_intersections)/(1+num_orders_in_window), where num_intersections is the number of intersections between the primary category of tags associated with the customer and the merchant, and where num_orders_in_window is the number of orders in a predetermined period of time. For example the primary tag may correspond to cuisine type, and the present merchant is tagged as Mexican. If the customer ordered from five restaurants with primary tags of Mexican out of nine total orders in the past 28 days, then the p_primary_category_v0 value for the pairing may be 6/10 or 0.6.

In some embodiments, the estimate of probability that the customer will order from the primary category of the merchant is based on merchants previously searched for by the customer (ratio_intersect_tags_search_v0) instead of merchants visited or ordered from by the customer.

In some embodiments, pair features may include the number of times the consumer has ordered from the merchant (cs_order_count_v1). This may be scaled as $1.0/(1.0+\text{math.exp}(-(\text{float}(cs\_order\_count)/2.0)))$. This feature may be determined based on a predetermined number of previous orders made by the customer, or a number of orders made by the customer within a predetermined number of days.

One or more of pair features may be determined for a predetermined number of previous orders or browsing sessions. In some embodiments, the values of the various pair features may be determined for information within a predetermined period of time, such as within the last 28 days.

Figure 7:
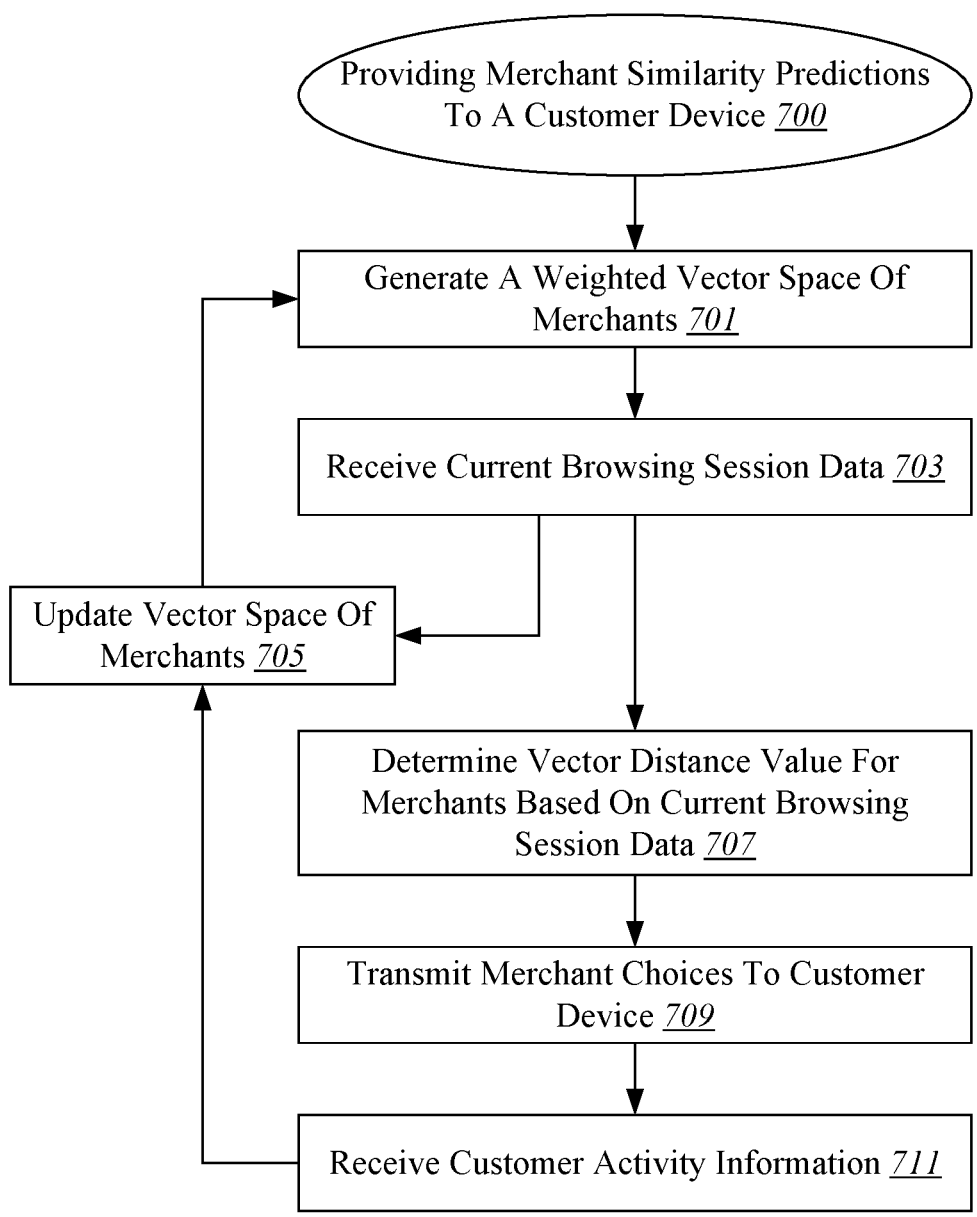
FIG. 7 illustrates an example process for providing merchant similarity predictions to a customer device, in accordance with one or more

In some embodiments, pair features include the distance between vectors corresponding to the customer profile information and the merchant profile information (store2vec_dist). The store2vec_dist feature may also be referred to herein as a "merchant similarity prediction." The store2vec_dist feature may incorporate various latent features between merchants and other merchants or user preferences with the knowledge-based portion of the recommendation model resulting in a hybrid recommender system. FIG. 7 illustrates an example process 700 for providing merchant similarity predictions to a customer device, in accordance with one or more embodiments. Process 700 may be implemented using a neural network comprising one or more computational layers. At operation 701, a weighted vector space of merchants is generated. In various embodiments, the weighted vector space of merchants is generated based on the merchants included in various historical browsing sessions, such as those received and stored in method 500.

Various processes may be implemented to convert merchants into vector representations. For example, each merchant may be vectorized via one-hot encoding based on the presence of the particular merchant among other merchants in various stored historical browsing sessions. In some embodiments, the merchants may be converted into vector representations based on alphabetical ordering of the names of the merchants. For example, in the browsing sessions shown in FIG. 4, the eight merchants may be alphabetically ordered in the following sequence: merchant 110, merchant 112, merchant 114, merchant 116, merchant 318, merchant 412, merchant 414, and merchant 416. As such, merchant 114 may be converted into a vector of [0, 0, 1, 0, 0, 0, 0, 0] based on such ordering, while merchant 416 may be converted into a vector of [0, 0, 0, 0, 0, 0, 0, 1]. In other embodiments, each merchant may be assigned numerical identifiers and numerically ordered based on the assigned numerical identifiers before being converted into vectors.

A glossary of merchant vectors may be created from all merchants included in a set of historical browsing sessions. In some embodiments, the merchants in stored historical browsing sessions may be grouped based on geographic location such that separate merchant glossaries are generated for different geographic locations or neighborhoods. In one example, browsing sessions 410, 420, and 430 may correspond to a predetermined geographic area.

Different approaches may be implemented to process the merchant vectors in such vector space model including count-based methods (e.g. Latent Semantic Analysis), and predictive methods (e.g. neural probabilistic language models). Count-based methods compute the statistics of how often some merchants co-occurs with its neighbor merchants in a large corpus of historical browsing sessions, and then maps these count-statistics down to a small, dense vector for each merchant. Predictive models directly try to predict a merchant from its neighbors in terms of learned small, dense embedding vectors (considered parameters of the model).

A predictive merchant association model similar to Word2vec may serve as a computationally-efficient predictive model for learning merchant embeddings from raw browsing sessions. According to one aspect, the predictive merchant association model may include a neural network that is trained to reconstruct browsing contexts of merchants in a browsing session. In some embodiments, the neural network may be a two layer neural network including an input layer, a hidden layer, and an output layer. In some embodiments, the neural network is a single hidden layer, fully connected neural network. However, in various embodiments, the neural network may include various other computational layers and configurations, including, but are not limited to, linear layers, convolution layers, deconvolution layers, residual layers, quadratic layers, etc.

A training corpus may include stored historical browsing sessions and a plurality of vector representations from the training corpus may be input as an input layer into a predictive merchant association model to generate a vector space, with each unique merchant assigned a corresponding vector in the space. The merchant vector representations may be positioned in the vector space such that associated merchants that share common characteristics are located in close proximity to one another in the vector space.

Using this weighted vector space, the neural network 700 can learn the relationship between merchants, such as between merchant 112 and merchant 116. Thus, the weighted vector space may represent the relationship between various latent features of the merchants, such as food type, order items, location, and convenience. For example, merchant 112 and merchant 116 may include a similar food type such as Chinese food, or a similar price range, because the merchants appear in the same browsing session. Thus, merchant 116 may be of interest to another customer who searches for merchant 112 during a browsing session, or vice versa. Thus, the network should be trained to show a high probability for merchant 116 when merchant 112 is inputted into the neural network. As such, merchant 112 may be referred to as the context merchant and merchant 116 may be referred to as the target merchant.

The neural network may be configured to produce probabilities for various merchants in the output layer to reflect the next merchant relationship with the context merchant at input. The output may be a probability for each merchant in the training corpus to appear in a randomly chosen position around the context merchant within a defined window. In various embodiments, the predictive merchant association model may implement various other training models, such as a Continuous Bag-of-Words model (CBOW) which predicts target merchants from source context merchants in a browsing session. In other embodiments, a Skip-Gram model may be used, which does the inverse and predicts source context-merchants from a particular target merchant in a browsing session.

Data for a current browsing session is then received at operation 703, such as described in operation 507 with reference to FIG. 5. For example, a customer may initiate a current browsing session on an application or web browser running on an associated customer device. This current browsing session may be considered customer profile information indicating customer interest in particular merchants. Based on the merchants and other information included in the data for the current browsing sessions, a store2vec-dist feature value may be determined for one or more context merchants at operation 707. For example, a target merchant may be retrieved from the current browsing session data and input into a predictive model, such as the neural network. In some embodiments, a target merchant may be selected from a stored historical browsing session associated with the customer. For example, a merchant may be randomly chosen as the target merchant from the most recent stored historical browsing session.

As previously described, the neural network may determine the store2vec_dist value of one or more context merchants that are associated with the target merchant based on the proximity of such associated merchants in the vector space to one or more merchants from the current browsing session. As previously described, this may correspond to a predicted probability that the associated merchant is associate or related to the current browsing session.

As previously described, in some embodiments, merchant or item selections in stored historical browsing sessions corresponding to a particular customer may be used to determine store2vec_dist feature values. As such, current browsing session data need not be received at step 603 to determine store2vec_dist feature values.

In some embodiments, the data for the current browsing session may be used to update the vector space of merchants at operation 705. This may cause an updated vector space of merchants in the neural network to be generated at 701, which may provide additional or different store2vec_dist value determinations at operation 707 based on a current browsing session.

At operation 709, merchant choices, and corresponding information, are transmitted to the customer device. The merchant choices may include one or more merchants, which may be displayed to the customer within the search results, or as a suggested merchant, as previously described with reference to FIG. 3. In some embodiments, one or more merchant choices may be transmitted to the customer via alternative mechanisms. For example, the predictive merchant association model may be used in conjunction with general recommendation systems, such as a customer preference recommendation system. As such, the selected merchant choices may be transmitted to the customer in an email or text message. As another example, merchant choices may be transmitted to the customer via a push notification in an application running on the customer device. Such notifications may be transmitted to the user at particular times of the day, such as during or just before customary meal times. The merchant choices may be displayed in a particular order based on ranking scores determined by the various features described above.

In some embodiments, customer activity information is received at operation 711, such as described in process 500. The confirmation may comprise any one of various actions taken by a user, such as a customer. For example, the confirmation may be a selection of the associated merchant by the customer for browsing. In some embodiments, the confirmation occurs when an order made by the customer from the associated merchant. In yet other embodiments, the user interface may include a selection for the customer to confirm or rate the relevance of the associated merchant to the current browsing session. The confirmation of merchant association may then be used to update the vector space of merchants at 705 for subsequent selections of associated merchants.

Systems and methods for determining vector distances between customer profile information and/or merchant profile information is further described in U.S. patent application Ser. No. 15/936,219 by Ramesh et al., filed on Mar. 26, 2018, titled DYNAMIC PREDICTIVE SIMILARITY GROUPING BASED ON VECTORIZATION OF MERCHANT DATA, which application is incorporated by reference herein in their entirety and for all purposes.

Such features are particularly suited for the local marketplace problem to predict the customer preferences. Each feature being used may include an associated learned coefficient. In various embodiments, the associated learned coefficient may be determined by various machine learning techniques. For example, core order model 610 may be implemented as a statistical machine learning model such as a logistic regression model, or as a tree-based learning model such as a gradient-boosted machine (GBM) model. In the logistic regression model version, core order model 610 is trained with a data set of customer profiles and known order behavior. Each customer profile and merchant profile pair may correspond to a set of feature values for one or more of the features as described above.

In some embodiments, default values may be used for features where information is missing or unavailable. For example, the default value for features may be 0.0. Other default values may be implemented in various embodiments, and different default values may be used for different features.

Each set of feature values is then vectorized or converted into a corresponding feature vector, such as by feature extraction or other appropriate vectorization technique. The resulting feature vector is input into core order model 610. For each feature vector that is input, a known output target is input. The known output targets may be a binary value corresponding to whether the customer corresponding to the associated customer profile ordered from the merchant corresponding to the associated merchant profile. For example, if an order occurred, the output target includes a value of 1, whereas if an ordered occurred, the output target includes a value of 0.

Core order model 610 may then generate a learned coefficient for each of the features included in the feature vector. As each feature vector and output target pair is input into core order model 610, the learned coefficients are adjusted. In various embodiments, the learned coefficients function as a weight or weighted factor for the corresponding feature in determining a final core order score.

Once trained, core order model 610 may then receive a feature vector corresponding to a current pairing of a customer profile and a merchant profile to output a core order score, P(o|c, s), which may correspond to the probability (between 0 and 1) that the customer corresponding to the current customer profile will order from the merchant corresponding to the current merchant profile. In the logistic regression version of the core order model, the core order score, P(o|c, s), for a merchant s may be determined by combining one or more of the features as:

$$\left(\frac{1.0}{(1.0 + \exp(-res))}\right)$$

where res is the sum of all of the feature values multiplied by their learned coefficients.

In the gradient-boosted machine model (GBM) version of core order model 610, a gradient-boosted decision tree model is implemented to determine the core order score. During training of the GBM model, various decision trees may be generated based on feature values in a pair of a customer profile and a merchant profile and known output targets. A current pairing of a customer profile and a merchant profile may then be input into the GBM model and an output of 0 or 1 may be generated for each decision tree. All outputs are then averaged to determine a probability that the customer corresponding to the current customer profile will place an order from the merchant corresponding to the current merchant profile.

In some embodiments, a combination of the logistic regression version and the GBM version of core order model 610 may be implemented to determine the core order score. For example, the logistic regression version may be implemented to determine an initial core order score for a set of available merchants. A subset of the highest scored available merchants may then be input into the GBM version of core order model 610 to generate new core order scores to determine the final ranking of the subset. Such system may be implemented because the GBM version may provide more accurate scores while taking more processing time and power. Thus, the logistic regression version may be implemented to initially identify the subset of highest ranking merchant profiles. The GBM version may then refine the core order scores of the subset of merchant profiles. However, in some embodiments the GBM version of core order model may be implemented prior to the logistic regression version.

In various embodiments, a core order score P(o|c, s) is determined by core order model 610 for a pairing between the customer and each available merchant. In some embodiments, all merchants within the delivery logistics system may be filtered based on customer location to determine the available merchants. For example, only merchants within a predetermined radius of the customer may be determined to be available merchants and scored for presentation to the customer during a browsing session. Available merchants may also be filtered based on search terms input by the customer during a current browsing session. The available merchants may then be listed for display at the user interface in an order corresponding to the associated ranking scores.

In some embodiments, additional features obtained from customer profile information and merchant profile information may be used by additional models to update the order ranking score of a particular merchant determined by core order model 610. Additional models, such as onboarding order model 620, ensemble order model 630, and retention model 640 may be implemented to update the order ranking score, as further described below.

Figure 8A:
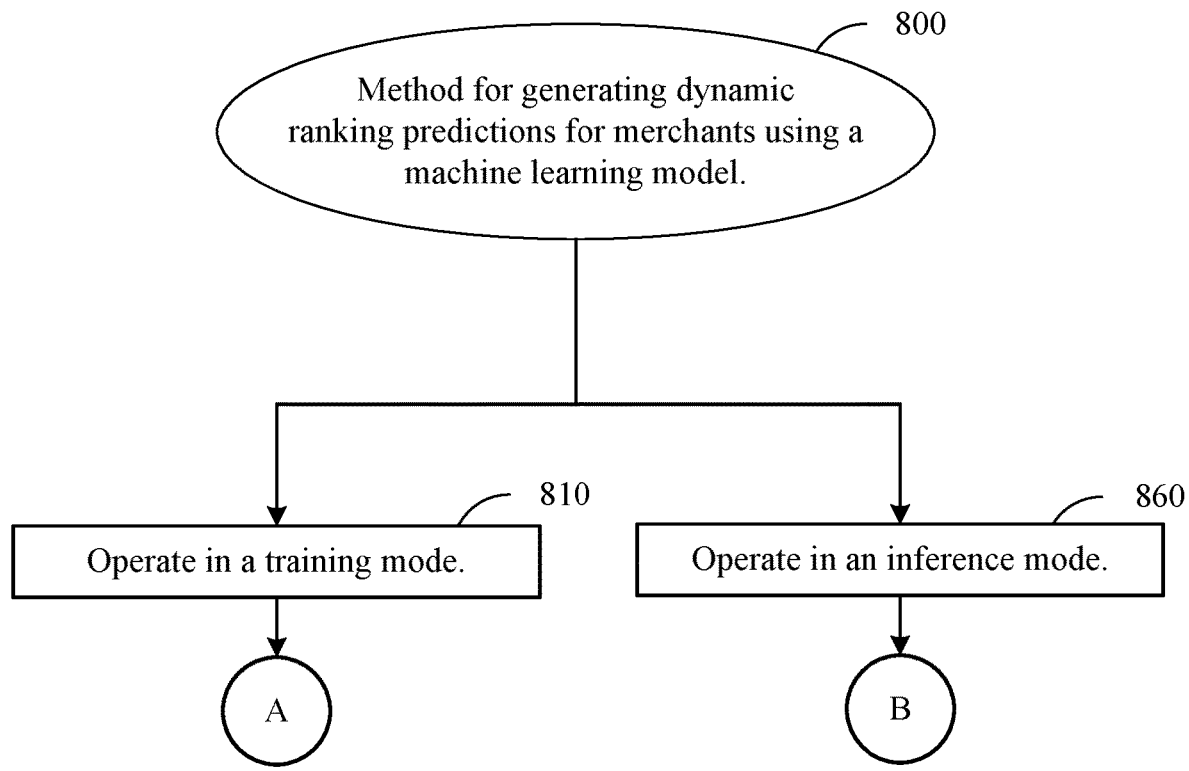
FIGS. 8A-8D illustrate an example method for generating dynamic ranking predictions for merchants using a machine learning model, in accordance with one or more embodiments.
Figure 8B:
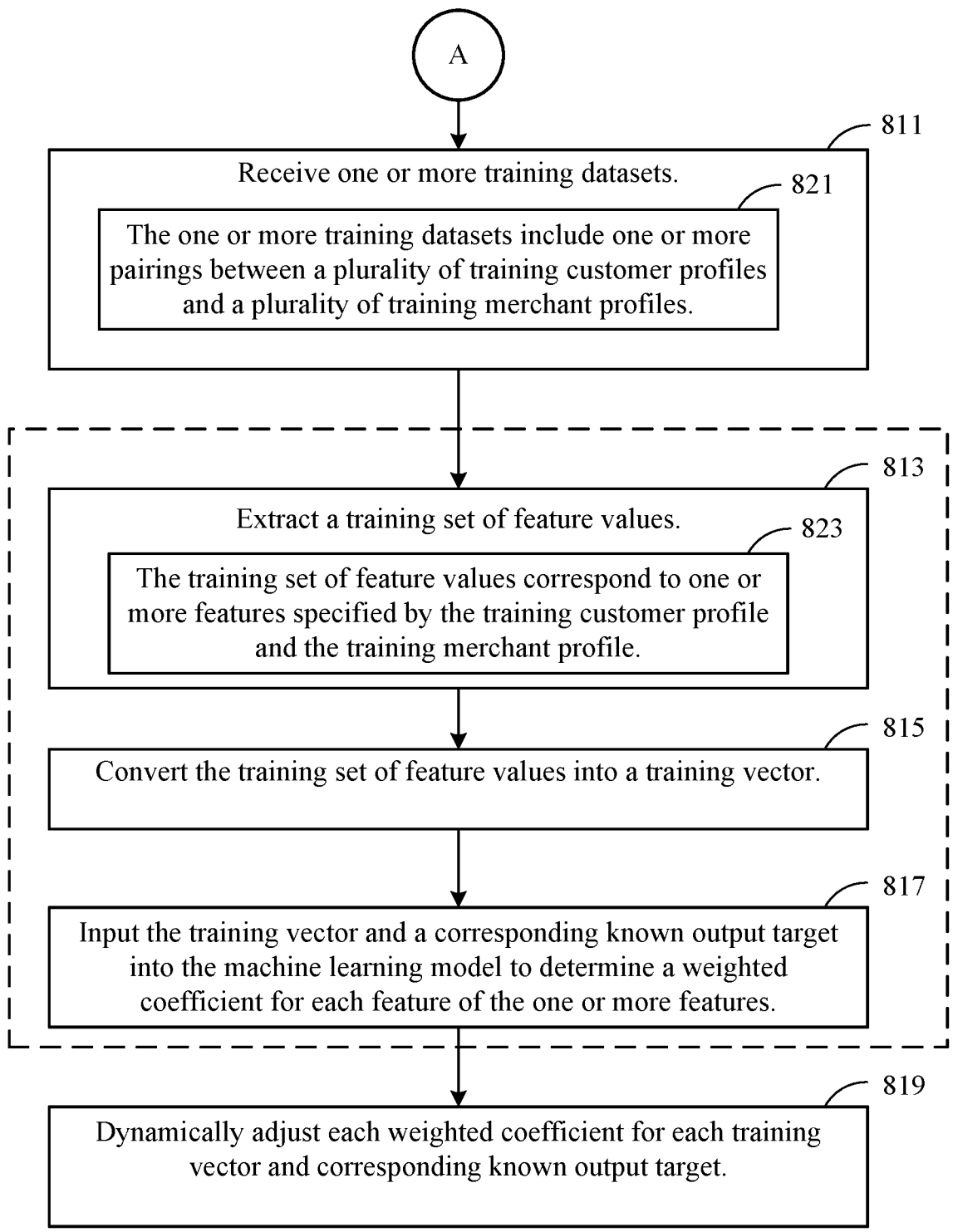
Figure 8C:
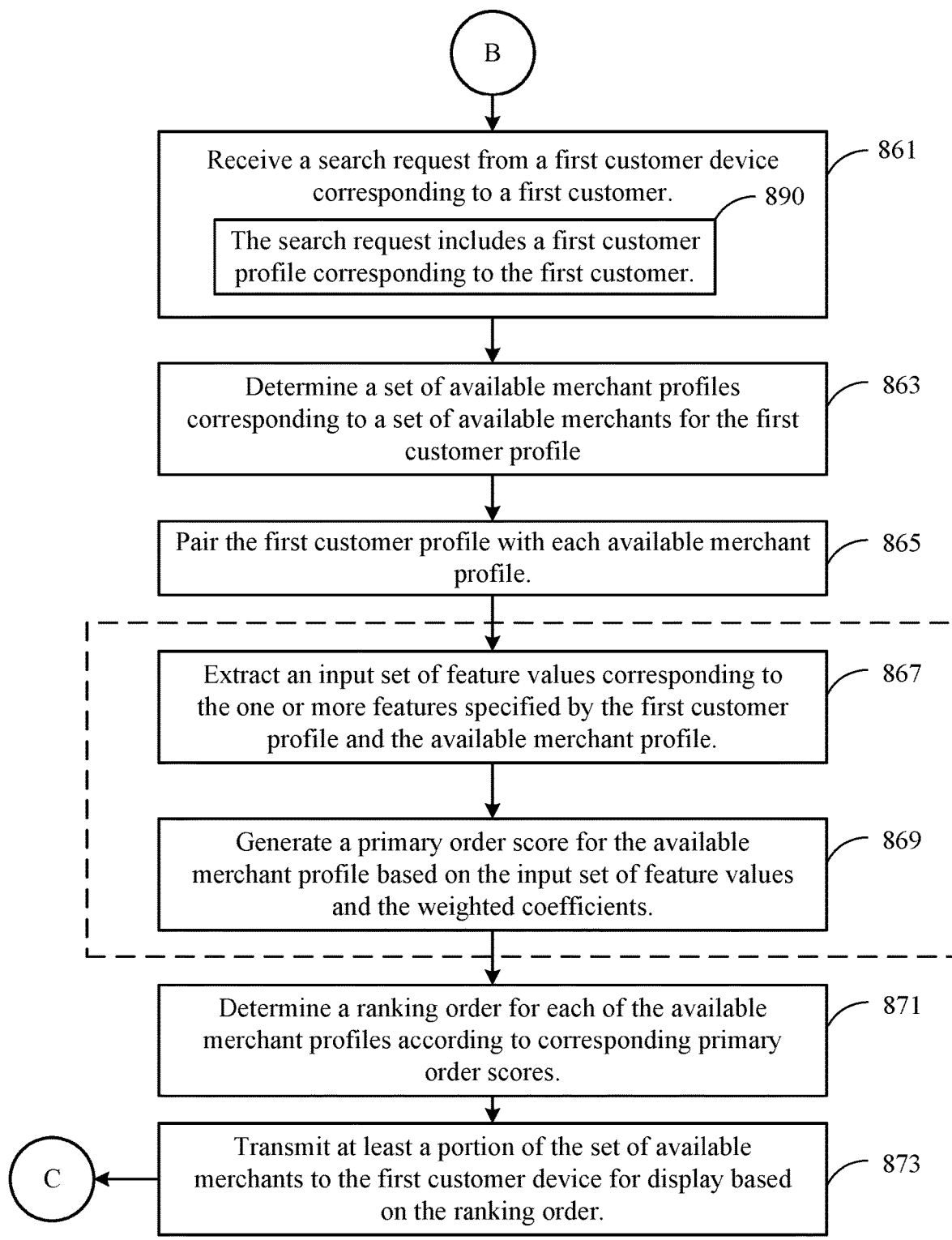
Figure 8D:
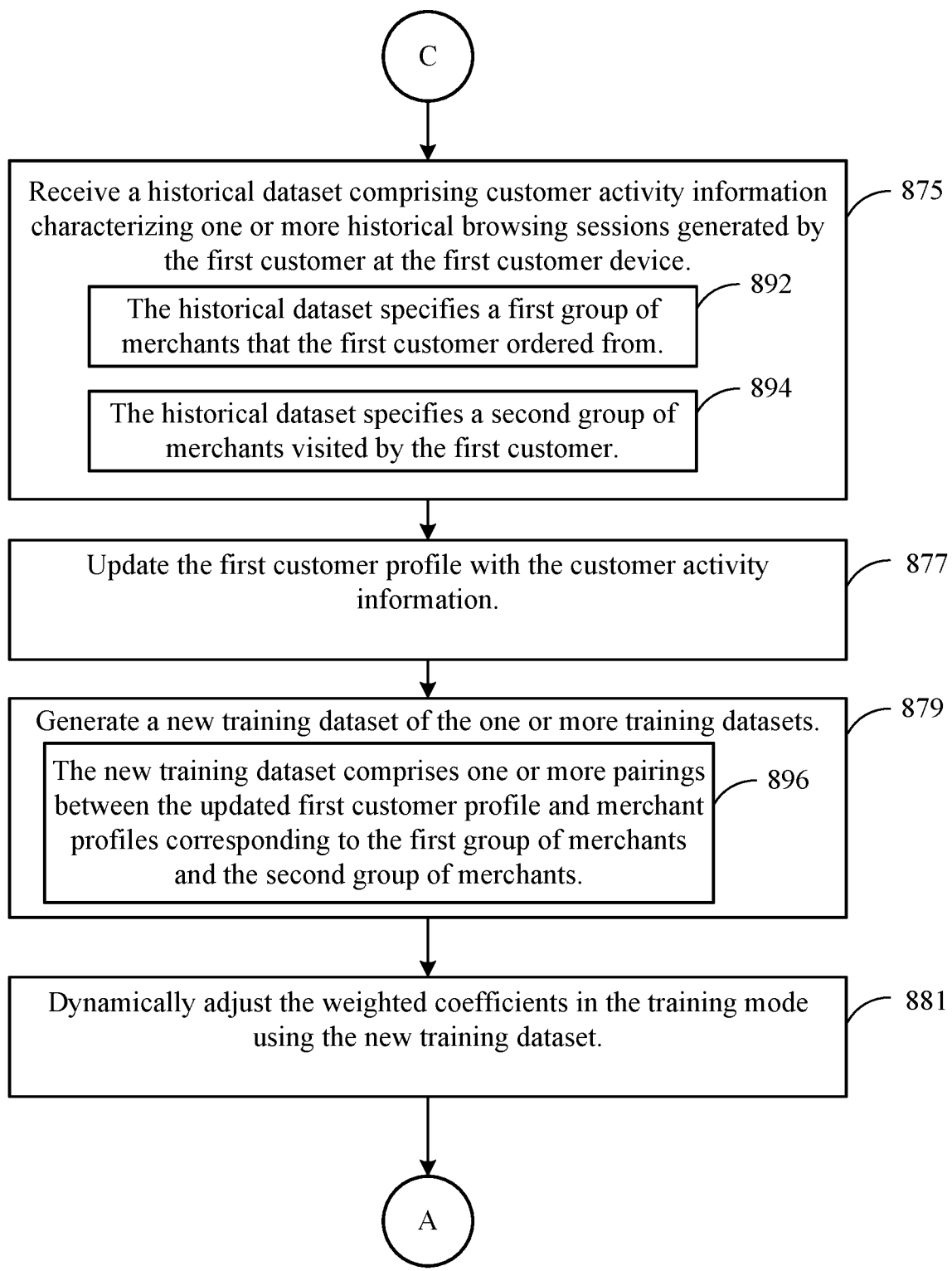

With reference to FIGS. 8A-8D, shown an example method 800 for generating dynamic ranking predictions for merchants using a machine learning model, in accordance with one or more embodiments. In certain embodiments, method 800 is implemented via a supervised machine learning model, such as core order model 610. FIG. 8B illustrates an example of operations of the machine learning model in a training mode 810, and FIGS. 8C-8D illustrate an example of operations of the machine learning model in an inference mode 860, in accordance with one or more embodiments.

When operating in the training mode, one or more training datasets 821 is received at operation 811. In some embodiments, the one or more training datasets 821 may include one or more pairings between a plurality of training customer profiles and a plurality of training merchant profiles. The one or more pairings may include sets of pairings, with each set of pairings including pairings between a particular training customer profile and one or more training merchant profiles. Each pairing between a training customer profile and a training merchant profile may be referred to as a training pair. Training customer profiles may be existing or historical customer profiles corresponding to users of a delivery logistics platform. Similarly, training merchant profiles may be existing or historical merchant profiles of a delivery logistics platform. In some embodiments, the training customer and merchant profiles may be hypothetical profiles generated for training the machine learning model. Training datasets may further comprise historical browsing data associated with the training customer profiles and the training merchant profiles.

The following operations 813, 815, and 817 may be implemented for each pairing between a training customer profile and a training merchant profile, as indicated by the dashed box. At operation 813, a training set of feature values is extracted. The training set of feature values may correspond to one or more features 823 specified by the training customer profile and the training merchant profile. The one or more features 823 may be a combination of one or more of the customer features, merchant features, and pair features previously described.

At operation 815, the training set of feature values is converted into a training vector. As previously described, training set of feature values may be converted into a training vector by any appropriate vectorization technique, such as feature extraction. The training vector may comprise a feature vector of a plurality of dimensions. In some embodiments, each dimension corresponds to a feature of the training set of feature values. At operation 817, the training vector is input into the machine learning model along with a corresponding known output target to determine a weighted coefficient for each feature of the one or more features 823. Each feature of the one or more features 823 may have a corresponding weighted coefficient. Each weighted coefficient may be a feature or value in a coefficient vector that is parallel to the training vector. The known output target may correspond to a value indicating whether the customer corresponding to the training customer profile ordered from the merchant corresponding to the paired training merchant profile. Such value may be 1 if the customer ordered from the merchant, and 0 if the customer did not order from the merchant.

As previously described, the machine learning model may correspond to a logistic regression model. As each training vector and corresponding known output target is input into the model, each weighted coefficient in the coefficient vector is dynamically adjusted at operation 819. As each training vector and corresponding output target are input into the machine learning model, the model adjusts the value of each weighted coefficient in the coefficient vector. The weighted coefficients for the features may then be extrapolated from the adjusted dimensions. The weighted coefficients or the coefficient vector may be stored in memory while the values are refined during the training process.

In some embodiments, the gradient descent based training for logistic regression stores all of the training set of features and corresponding training vectors in memory and iterates the training process multiple times until determined to be sufficiently trained. The model may be determined to be sufficiently trained once the training loss stops decreasing. In various embodiments, such training loss (Log Loss) may be determined as:

$$\text{Log Loss} = \sum_{(x,y) \in D} -y\log(y') - (1-y)\log(1-y')$$

where $(x, y) \in D$ is the data set containing many labeled examples, which are $(x, y)$ pairs; $y$ is the label in a labeled example such as the known output target (every value of $y$ must be either 0 or 1); and $y'$ is the predicted value (somewhere between 0 and 1), given the set of features in $x$ (corresponding to the training set of features). In some embodiments, the model is determined to be sufficiently trained once a predetermined number of training pairs have been input into the predictive model. In some embodiments, the model is determined to be sufficiently trained once it is able to make scoring predictions within a predetermined margin of error.

In various embodiments, different core order models may be trained for different geographical regions to account for different user preferences, merchant offerings, and courier activity in those regions. The different core order models may be trained on different sets of training data gathered from the particular regions.

Once sufficiently trained, core order model 610 may operate in the inference mode 860 to determine a primary order score, such as the core order score $P(o|c, s)$, for a particular merchant with respect to a particular customer. When operating in the inference mode 860, a search request 890 is received from a first customer device corresponding to a first customer at operation 861. In various embodiments, a search request may be generated at the first customer device. For example, a search request may be generated by initiation of an application on the first customer device to access the delivery logistics platform. As another example, a search request may be generated by an input of one or more search terms in the application by the first customer. In some embodiments, the search request is transmitted to a server of the delivery logistics platform.

At operation 863, a set of available merchant profiles is determined. The set of available merchant profiles corresponds to a set of available merchants for the first customer profile. In some embodiments, the set of available merchants may comprise all merchants within the delivery logistics platform. In some embodiments, the set of available merchants may be filtered from a global list of merchants based on the customer profile data, such as proximity. For example, the location of the first customer may be recorded at the first customer device or input by the first customer and stored within the first customer profile. The set of available merchants may comprise merchants within a predetermined area of the location. In some embodiments, the set of available merchants may be filtered by time of day. For example, merchants that are closed during the time of the search request may be filtered out. In some embodiments, the set of set of available merchants are filtered from a global list of merchants based on tags corresponding to search terms entered by the first customer at the first customer device. For example, if the first customer enters Mexican as a search term to generate the search request, then only merchants with merchant profiles that include a tag for Mexican cuisine type are included the set of available merchants.

At operation 865, the first customer profile is paired with each available merchant profile. The following operations 867 and 869 may be implemented for each pairing of the first customer profile and an available merchant profile, as indicated by the dashed box. At operation 867, an input set of feature values is extracted. The input set of feature values corresponds to the one or more features specified by the first customer profile and the available merchant profile. The one or more features may be a combination of one or more of the customer features, merchant features, and pair features previously described. In some embodiments, the input set of feature values may be converted into an input vector representation or input vector.

At operation 869, a primary order score is generated for the available merchant profile based on the input set of feature values and the weighted coefficients. The primary order score may be core order score P(o|c, s), which may be determined by the following:

$$\left(\frac{1.0}{(1.0 + \exp(-res))}\right)$$

In various embodiments, res is the sum of all of the feature values multiplied by their learned coefficients. In some embodiments, the core order score P(o|c, s) may be determined by the following:

$$\left(\frac{1.0}{(1.0 + \exp(-\beta \cdot x))}\right)$$

where β·x is the dot product of the coefficient vector of weighted coefficients and the input vector, expressed as: β·x.

The primary order score, or core order score, may be used as recommendation score 650 absent any other implemented models shown in FIG. 6 As previously described, the primary order score may correspond to a probability that the first customer will place an order from the particular available merchant. Thus, in particular embodiments, the value of the primary order score may be a value between 0 and 1. At operation 871, a ranking order is determined for each of the available merchant profiles according to corresponding primary order scores. For example, the merchant profiles with a larger primary order score are ranked higher and positioned before merchant profiles with a lower primary order score. In some instances, merchant profiles may receive the same primary order score. In such an event, the tying merchant profiles may be further ranked based on a combination of various other characteristics or previously described features. For example, tying merchant profiles may be organized in alphabetical order. In other examples, tying merchant profiles may be further ordered based on average customer reviews, number of sales within a predetermined period, average delivery time, etc. At least a portion of the set of available merchants is then transmitted to the first customer device for display based on the ranking order at operation 873. As such, the first customer receives, at the first customer device, a list of merchants displayed in the ranking order in response to the search request.

In the GBM version of core order model 610, the training sets of feature values and corresponding known output targets are input to generate a plurality of decision trees based on the values of the feature values. Each node in the decision tree may correspond to a feature and rules may be determined based on the value of the feature value in the training sets. For a particular training set of feature values, the GBM core order model may create a first optimal tree that performs the best on the particular first training set. A subsequent decision tree may then be added to optimize for the gradient of the loss function. Additional subsequent decision trees may be added as such. Each independent decision tree may include nodes for any number of features, and various combinations of features and ordering of the features may be implemented. During the inference mode 860, an input set of feature values may be input into the plurality of decision trees generated during the training mode 810. Each decision tree that predicts an order by the first customer may output a value of 1, while each decision tree that predicts no order by the first customer may output a value of 0. All outputs may then be averaged to determine a primary order score with a value between 0 and 1. As previously described, scores may be determined using a combination of a logistic regression model and a gradient boosted decision tree model.

In some embodiments, additional training datasets are used to dynamically update the weighted coefficients on an ongoing basis. As customers browse, visit, or order from various merchants from corresponding customer devices the customer activity may be stored as historical browsing session data in a historical dataset. For example, such historical datasets may be received at operation 875. The historical dataset may comprise customer activity information characterizing one or more historical browsing sessions generated by the first customer at the first customer device. The historical dataset may specify a first group 892 of merchants that the first customer ordered, and a second group 894 of merchants visited by the first customer. The historical dataset may specify additional groups of merchants, such as merchants that were presented to the first customer, but were not visited or ordered from. The historical dataset may specify various other customer activity information as previously described.

At operation 877, the first customer profile is updated with the customer activity information. For example, additional tags may be associated with the first customer profile based on the merchants that the first customer visited or ordered from in prior browsing sessions. Certain tags may also be disassociated with the first customer profile. For example, if tags were associated with the first customer profile based on merchants visited by the first customer beyond a predetermined time period, such as 28 days, such tags may be disassociated from the first customer profile. Merchant profiles may also be updated at operation 877. For example, various merchant features previously described may be updated based on orders, visits, and other customer activity by the first customer and other customers.

The customer profiles and merchant profiles may then be updated to produce new training datasets with updated feature values, and input into the machine learning model. At operation 879, the updated customer and merchant profiles may then be used to generate a new training dataset 896 of the one or more training datasets. The new training dataset 896 may comprise one or more pairings between the updated first customer profile and merchant profiles corresponding to the first group 892 and second group 894 of merchants. At operation 881, the weighted coefficients are dynamically adjusted in the training mode using the new training dataset 896. For example, new training sets of feature values may be extracted for each pairing between the updated first customer profile and the merchant profiles in the new training dataset 896, converted into new training vectors, and input into the machine learning model.

Core order model 610 presents a hybrid recommender system which implements a combination of a knowledge-based recommender system that incorporates latent features from the weighted vector space of merchants. A data sparsity problem arises when providing recommendations for a local marketplace because not every customer can see every merchant, making it a different challenge than those faced by existing e-commerce recommendation platforms. The knowledge-based recommender system uses historical data sets which may be consolidated from various endpoints (customers, merchants, couriers) to overcome data sparsity problems to provide accurate predictions even when data is lacking for a particular customer or particular merchant, or lacking in a particular geographical area. The features considered by the core order model, as well as the other models in the recommendation model are also particularly suited to the local marketplace problem.

Onboarding Order Model

In various embodiments, merchant suggestions may be additionally, or alternatively, provided based on preference information received from such customers. For example, in certain situations, features and other information for some customers may be limited, or not available. This may be described as a cold-start problem, in cases where new merchants or new customers enter the system or platform. Onboarding model 620 may determine an additional onboarding order score P(o|q) for various available merchants for a particular customer based on preference information received from the particular customer. The onboarding order score P(o|q) may correspond to an estimate of probability that the customer will order from the primary category of the merchant based on the cuisine types selected by the customer.

Figure 9A:
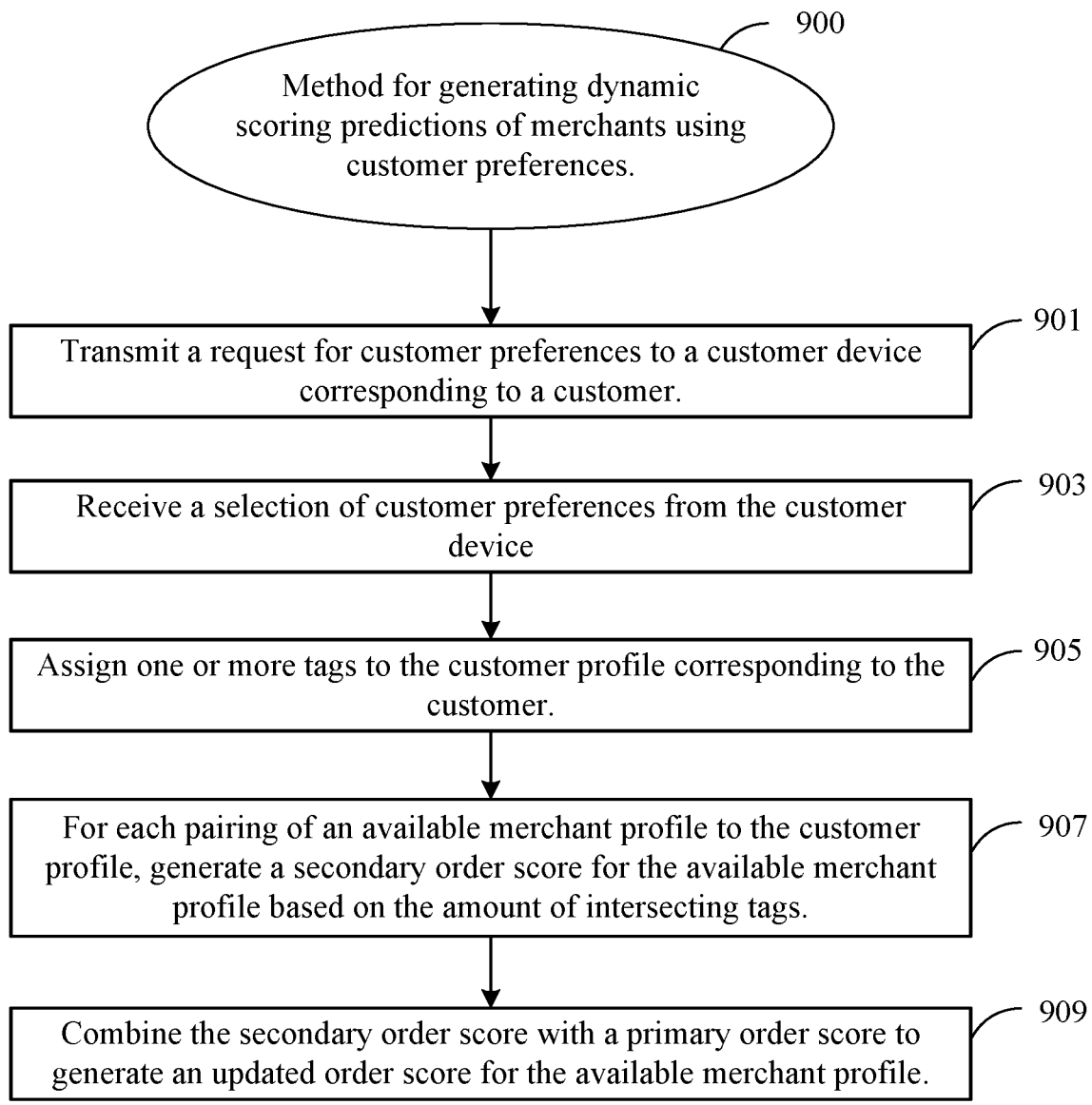
FIG. 9A illustrates an example method for scoring predictions of merchants using customer preferences, in accordance with one or more embodiments.

With reference to FIG. 9A, shown is an example method 900 for scoring predictions of merchants using customer preferences, in accordance with one or more embodiments. In various embodiments, method 900 may be implemented via onboarding model 620. At operation 901, a request for customer preferences is transmitted to a customer device, such as the first customer device. In some embodiments, input from a customer may be requested by transmitting a message to the customer device including a request for customer preferences to be displayed on the user interface of the customer device.

Figure 9B:
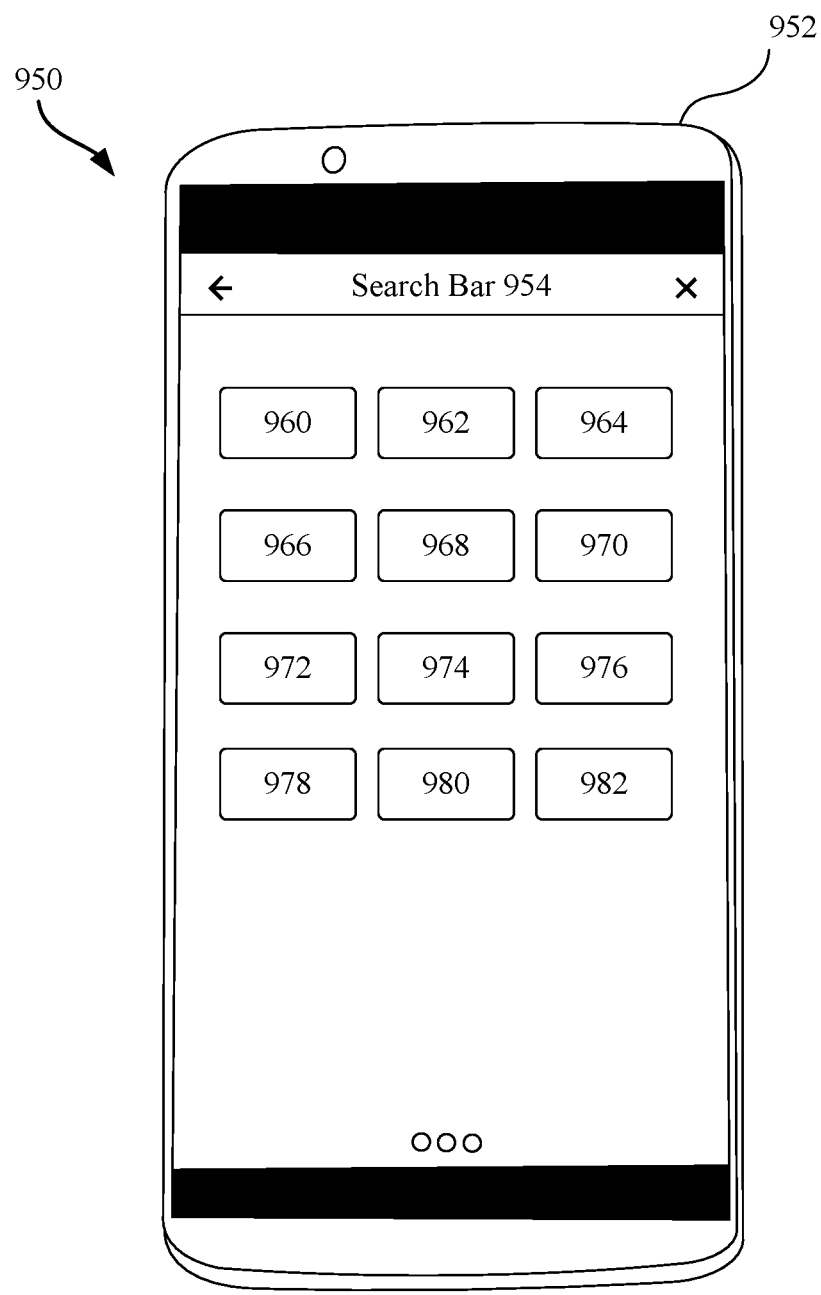
FIG. 9B illustrates an example user interface on a client device displaying a request for customer preferences, in accordance with one or more embodiments.

Such message may comprise a quiz or questionnaire requesting customer input. FIG. 9B illustrates an example user interface 952 on a client device 950 displaying a request for customer preferences, in accordance with one or more embodiments. In some embodiments, client device 950 may be a customer device corresponding to any one of customers 130-136. The request for customer preferences may include a prompt for the customer to select one or more preferences in one or more categories such as cuisine type, dietary restrictions, food preferences, food allergies, etc. For example, the first customer may select a preference for Mexican cuisine type and vegetarian dietary restriction.

The customer may be prompted to select a predetermined number of selections. For example, the customer may be prompted to select three preferences for cuisine type and may be presented selection boxes 960-982. In some embodiments, a customer may input a preference in search bar 954 if a desired preference is not displayed as a selection box.

With reference back to method 900, a selection of customer preferences is received from the customer device at operation 903. Each selection may be associated with one or more tags. As previously described, each category may correspond to a primary category, secondary category, and tertiary category of tags, and so on. For example, cuisine type preferences may be categorized as primary tags. In some embodiments, the customer may rank the selections to associate the tags with a primary category, secondary category, and so on. For example, Mexican cuisine type may be ranked first and be associated with a primary tag, while Thai cuisine type may be ranked second and be associated with a secondary tag, even though both tags are the same category of cuisine type.

The one or more tags may be assigned to the customer profile corresponding to the customer at operation 905. For example, tags associated with Mexican and vegetarian may be assigned to the first customer profile based on the received selection of customer preferences. Such assignment of tags may also be used to update the first customer profile for generating a new training dataset, such as in operation 877, for adjusting weighted coefficients in method 800.

For each pairing of an available merchant profile to the customer profile, a secondary order score is generated for the available merchant profile based on the amount of intersecting tags at operation 907. The secondary order score may be onboarding order score P(o|q) which may be defined as onboarding_p_primary_category_v0. onboarding_p_pimrary_category_v0 is similar to the feature p_primary_category_v0 used in core order model 610, except that it compares the merchant's primary category against the categories in the onboarding quiz instead of those from the customer's previous orders. As such, P(o|q) may be determined be calculated based on additive smoothing as: (1+num_intersections)/(1+num_cust_selections), where num_intersections is the number of intersections (set or non-set) between the tags of the current merchant profile and the tags corresponding to the selections made by the customer during the onboarding quiz, and where num_cust_selections is the total number of selections made by the customer at the customer device.

In the example above, the first customer profile has been assigned tags for Mexican and vegetarian based on the received selection of customer preferences. When paired with an available merchant profile with an associated primary tag for Mexican, there would be one resulting intersection. As such, the secondary score for the available merchant profile would be ⅔ or 0.667.

Where there is insufficient customer information for implementation of core order model 610, the ranking of merchants may be entirely based on the onboarding order score from onboarding order model 620 which may be used a recommendation score 650, absent any other implemented models shown in FIG. 6. However, where there is sufficient information, both models may be implemented and core order score from core order model 610 and onboarding order score from onboarding order model 620 may be combined via ensemble order model 630. At operation 909, the secondary order score is combined with the primary order score to generate an updated order score for the available merchant profile. Thus, ensemble model 630 may integrate onboarding preference information with core order model 610 to determine an updated order score, which may be referred to herein as ensemble order score P(o|c, s, q). Ensemble order score P(o|c, s, q) may be determined by:

$$(1-\beta(q))P(o|c,s)+\beta(q)P(o|q)$$

Here $\beta(q)$ controls the weight of the onboarding preferences. For example, where there are no onboarding preferences, $\beta(q)$ is 0 and core order model 610 is unchanged. When there are onboarding preferences, the weight may depend on how many orders have occurred since the onboarding preference selections were input (onboarding_order_delta).

In some embodiments, $\beta(q)$ may be determined by:

$$\beta(q)=1.84202 \times 0.271442^{onboarding\_order\_delta+1}$$

As an example, where onboarding_order_delta=0, the weight $\beta(q)$ is 0.5. As another example, where onboarding_order_delta=3, the weight $\beta(q)$ is 0.01. Thus, as more orders are placed since the onboarding preference selections were input, the significance of the onboarding ranking score is reduced.

In an example embodiment, ensemble order model 630 inputs the following features: onboarding_cuisine_prefs (a list of integers of business category IDs), onboarding_num_prior_orders (the number of prior orders when the onboarding data was saved), num_prior_orders (the current number of prior orders; if none, should be 0), and onboarding_data_present (a Boolean representing whether there is onboarding data or not).

Retention Model

Absent any other implemented models shown in FIG. 6, the updated order score, or ensemble order score may be used as recommendation score 650. However, the primary order score, secondary order score, or updated order score may be further updated by additional considerations. For example, retention model 640 may be implemented to determine a retention score P(r|c,s) indicating the probability of retention of a customer based on ordering from a particular merchant. In some embodiments, the retention score corresponds to the probability that the customer will place an order on the delivery logistics platform within the next 28 days if they place an order with a particular merchant at the given time. Retention model 640 may implement a logistic regression model based on various features corresponding to customer satisfaction. Such features may include, but are not limited to, the number of orders from a particular merchant that resulted in delayed or late deliveries, the total number of delayed or late orders received by the customer in a given period of time, the number of deliveries from a particular merchant that included missing or incorrect items, the number of deliveries to a customer that resulted in missing or incorrect items in a given period of time, and the average price of order placed by a customer in a given amount of time.

For example, features input into retention model 640 may include: the percent of orders in the past 28 day for the merchant that were late (store_pct_late_orders); the number of late orders of the customer's past five orders (consumer_prior_avg_late_orders_5o); the percent of orders in the past 28 days for the store that were missing or incorrect (store_pct_mi_orders); the number of missing or incorrect orders of the consumer's past five orders (consumer_prior_avg_mi_orders_5o); and the average subtotal of the consumer's past five orders (consumer_prior_avg_subtotal_5o).

Retention model 640 may be trained using similar techniques and steps as core order model 610. The corresponding feature values may be extracted from historical datasets for a and input as training data into retention model 640 to generate weighted coefficients for the features described. The training data for retention model 640 may comprise pairings of historical customers and historical merchants that the historical customer ordered from. The corresponding feature values for each pairing may be vectorized and input along with a known output target, corresponding to whether the historical customer placed a subsequent order in the 28 days following the order placed to the historical merchant. If an order was placed within 28 days, the output target may have a value of 1, whereas if no order was placed within 28 days, the output target may have a value of 0. The weighted coefficients may be then be applied to features extracted from the pairing of the first customer profile and an available merchant profile to determine a retention score P(r|c,s). In some embodiments, a retention score may be determined for an available merchant s by combining the features as:

$$\left(\frac{1.0}{(1.0 + \exp(-res))}\right)$$

As for the core order score, res may be the total of the sum of all the features multiplied by their corresponding weighted coefficient in retention model 640.

The retention score P(r|c,s) from retention model 640 may then be combined with the updated order score from ensemble order model 630 to determine recommendation score 650-A. In some embodiments, combination may be a linear combination of the scores where the retention score is assigned a fixed weight or a weight based on predetermined factors. In some embodiments, the retention score may be combined with only the core order score or only the onboarding order score, where one or more of the corresponding models are not implemented. For example, where onboarding order model 620 is not implemented, the retention score may be combined with the core order score from the core order model to determine recommendation score 650.

Thus, the overall architecture of merchant recommendation model 600 provides various advantages. The personalized merchant recommendation model 600 may be implemented along with an index that provides search engine capabilities, such as a distributed Lucene-based inverted index. The merchant recommendation would not contributed to latency of the search since there would only be one extra database read per search call, which may also be cached. The recommendation system is also horizontally scalable. Higher search volume results in more heap usage, which can be addressed by adding more nodes to the index cluster or increasing head size per node.

The overall architecture may also be implemented with different types of machine-learning models, such as logistic regression or GBM models. For example, different versions of core order model may be implemented without changing the other order models. The recommendation model is also fault tolerant where the customer profile cannot be retrieved. In such instances, a default non-personalized feed function of the index may be implemented based on search terms and cached data.

Figure 10:
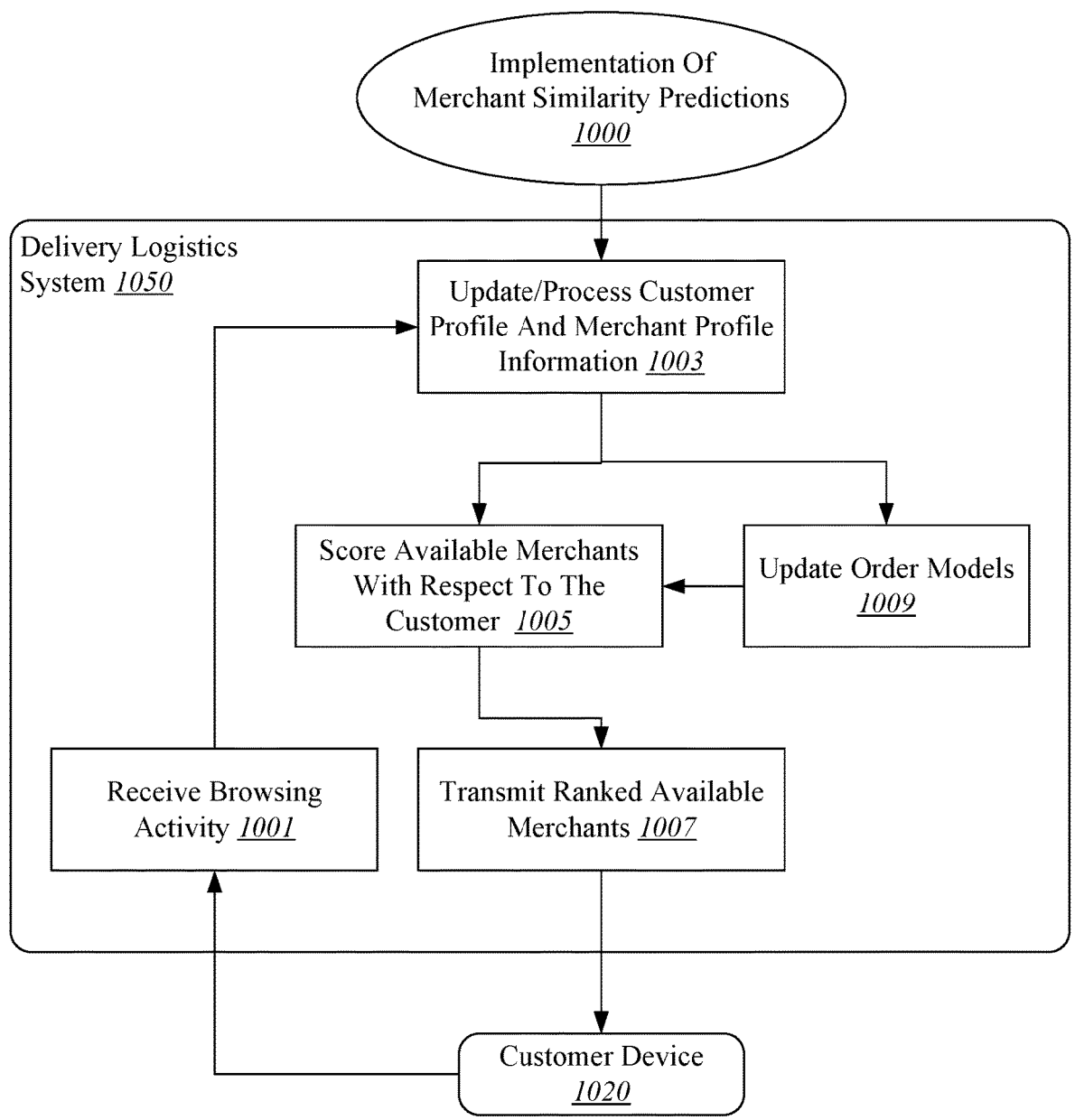
FIG. 10 illustrates an example flow process for implementation of ranking merchant search results in a delivery logistics system, in accordance with one or more embodiments.

FIG. 10 illustrates an example flow process 1000 for implementation of ranking merchant search results in a delivery logistics system 1050, in accordance with one or more embodiments. As previously described, the described systems may include a predictive merchant ranking model for generating order scores for merchants for display to a customer in a browsing session.

At step 1001, browsing activity is received at the delivery logistics system 1050 from customer device 1020. Customer device 1020 may be any one of various user devices 202-208 corresponding to a customer, such as device 320 or 952. Such browsing activity may include a search request for merchants.

Once sufficiently trained, system 1050 may update or process the customer profile information and merchant profile information based on the browsing activity, including identifying available merchants based on the search request, pairing the available merchants with the customer, and extracting feature values for each pairing. The available merchants are then scored with respect to the customer at step 1005. The available merchants may be scored based on inputting the corresponding feature values into one or more order models of merchant recommendation model 600.

The available merchants may then be ranked and transmitted to customer device 1020 at step 1007. The available merchants may be displayed at a user interface of the customer device in an order based on the ranking in response to the search request.

As the customer views the ranked merchants, additional browsing activity is received at step 1001. In addition to a search request, additional browsing activity may also include information regarding selections, visits, and orders and other customer activity. Other customer activity may include items browsed, items added to a shopping cart, items removed from a shopping cart, registered complaints, ratings and reviews, etc. Such additional browsing activity may be used to update customer profile and merchant profile information at step 1003.

As the, customer profile and merchant profile information is updated, it may be further processed to score subsequent available merchants based on subsequent search requests from the browsing activity transmitted by customer device 1020.

In some embodiments, the updated customer profile and merchant profile information may be used to update order models 1009 of the merchant recommendation model at step 1009. For example, weighted coefficients of core order model 610 may be updated in training mode 810 based on updated customer profile and merchant profile information. The updated order models may be implemented to score available merchants at step 1005 in response to subsequent browsing sessions or subsequent search requests within the same browsing session. In some embodiments, order models may be updated at step 1009 in real-time as merchants are being scored for a particular search request. Thus, merchants may be scored for a subsequent search request using a model updated from the previous search.

As such, the weighted coefficients of core order model may be updated in real-time or near real-time. Furthermore, merchant and customer profiles may also be updated in real-time or near real-time. This function allows core order model to provide scoring predictions based on the most current information in the system which reflect the most accurate customer preferences.

Various computing devices can implement the methods described herein. For instance, a mobile device, computer system, etc. can be used to generate a weighted vector space of merchants and/or items for order. With reference to FIG. 11, shown is a particular example of a computer system 1100 that can be used to implement particular examples of the present disclosure. According to particular example embodiments, a system 1100 suitable for implementing particular embodiments of the present disclosure includes a processor 1111, a memory 1103, an interface 1111, and a bus 1115 (e.g., a PCI bus). When acting under the control of appropriate software or firmware, the processor 1111 is responsible for processing inputs through various computational layers and algorithms in a machine learning model or neural network. In some embodiments, the processor is responsible for updating the parameters of each computational layer using algorithms, including but not limited to, a stochastic gradient descent algorithm and a backpropagation algorithm. Various specially configured devices can also be used in place of a processor 1111 or in addition to processor 1111. The complete implementation can also be done in custom hardware.

The interface 1111 is typically configured to send and receive data packets or data segments over a network. Particular examples of interfaces the device supports include Ethernet interfaces, frame relay interfaces, cable interfaces, DSL interfaces, token ring interfaces, and the like. The interface 1111 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1100 uses memory 1103 to store data and program instructions for operations including training a machine learning model or a neural network, and generating dynamic ranking and scoring predictions for merchants, such as in methods 800 and 900. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A programmable device configured for generating dynamic ranking predictions of merchants using a machine learning model,
   wherein the programmable device is configured to operate in a training mode to:
     obtain one or more training datasets including one or more pairings between a plurality of training customer profiles and a plurality of training merchant profiles; and
     for each pairing between a training customer profile and a training merchant profile,
       extract a training set of feature values corresponding to one or more features specified by the training customer profile and the training merchant profile;
       convert the training set of feature values into a training vector; and input the training vector and a corresponding known output target into the machine learning model to determine a weighted coefficient for each feature of the one or more features; and dynamically adjust each weighted coefficient for each training vector and corresponding known output target; and wherein the programmable device is further configured to operate in an inference mode to:

receive a search request from a first customer device corresponding to a first customer, wherein the search request identifies a first customer profile corresponding to the first customer;

determine a set of available merchant profiles corresponding to a set of available merchants for the first customer profile;

pair the first customer profile with each available merchant profile;

for each pairing of the first customer profile and an available merchant profile, extract an input set of feature values corresponding to the one or more features specified by the first customer profile and the available merchant profile;

generate a primary order score for the available merchant profile based on the input set of feature values and the weighted coefficients;

determine a ranking order for each of the available merchant profiles according to corresponding primary order scores; and transmit information pertaining to at least a portion of the set of available merchants to the first customer device for display based on the ranking order; and wherein the programmable device is further configured to operate in an update mode to:

process an order received from the first customer for at least one item from a first merchant of the portion of the set of available merchants;

store a historical dataset indicating that the first customer ordered from the first merchant; and dynamically update the weighted coefficients by inputting values from the historical dataset into the machine learning model.

2. The programmable device of claim 1, wherein the programmable device is further configured to:

receive a historical dataset comprising customer activity information characterizing one or more historical browsing sessions generated by the first customer at the first customer device, wherein the historical dataset specifies a first group of merchants that the first customer ordered from and a second group of merchants visited by the first customer;

update the first customer profile with the customer activity information;

generate a new training dataset of the one or more training datasets, wherein the new training dataset comprises one or more pairings between the updated first customer profile and merchant profiles corresponding to the first group of merchants and the second group of merchants; and dynamically adjust the weighted coefficients in the training mode using the new training dataset.

3. The programmable device of claim 1, wherein the set of available merchants are filtered from a global list of merchants based on proximity to a location of the first customer.

4. The programmable device of claim 1, wherein the set of available merchants are filtered from a global list of merchants based on tags corresponding to search terms entered by the first customer at the first customer device.

5. The programmable device of claim 1, wherein each training customer profile corresponds to a historical customer;

wherein each training merchant profile corresponds to a historical merchant; and wherein the training set of feature values extracted for each pairing between a training customer profile and a training merchant profile includes a combination of one or more of the following:

an average price range of merchants visited by the historical customer, an average delivery fee paid by the historical customer, an average item value of the historical merchant, an average delivery time of the historical merchant, and a number of intersecting tags between the training customer profile and the training merchant profile.

6. The programmable device of claim 1, wherein the programmable device is further configured to:

transmit a request for customer preferences to the first customer device;

receive a selection of customer preferences from the first customer device;

assign one or more tags to the first customer profile, the one or more tags corresponding to the selection of customer preferences; and for each pairing of the first customer profile and an available merchant profile, generate a secondary order score for the available merchant profile based on an amount of intersecting tags between the first customer profile and the available merchant profile.

7. The programmable device of claim 6, wherein the programmable device is further configured to:

for each pairing of the first customer profile and an available merchant profile, combine the primary order score and the secondary order score to generate an updated order score for the available merchant profile.

8. The programmable device of claim 7, wherein for each pairing of the first customer profile and an available merchant profile, the primary order score and the secondary order score for the available merchant profile are weighted based on an amount of orders placed by the first customer in a predetermined time period.

9. A method for generating dynamic ranking predictions of merchants using a machine learning model, the method comprising: in a training mode:

obtaining one or more training datasets including one or more pairings between a plurality of training customer profiles and a plurality of training merchant profiles; and for each pairing between a training customer profile and a training merchant profile, extracting a training set of feature values corresponding to one or more features specified by the training customer profile and the training merchant profile;

converting the training set of feature values into a training vector; and inputting the training vector and a corresponding known output target into the machine learning model to determine a weighted coefficient for each feature of the one or more features; and dynamically adjust each weighted coefficient for each training vector and corresponding known output target; and in an inference mode:
receiving a search request from a first customer device corresponding to a first customer, wherein the search request identifies a first customer profile corresponding to the first customer;
determining a set of available merchant profiles corresponding to a set of available merchants for the first customer profile;
pairing the first customer profile with each available merchant profile;
for each pairing of the first customer profile and an available merchant profile,
extracting an input set of feature values corresponding to the one or more features specified by the first customer profile and the available merchant profile;
generating a primary order score for the available merchant profile based on the input set of feature values and the weighted coefficients;
determining a ranking order for each of the available merchant profiles according to corresponding primary order scores; and
transmitting information pertaining to at least a portion of the set of available merchants to the first customer device for display based on the ranking order; and in an update mode:
processing an order received from the first customer for at least one item from a first merchant of the portion of the set of available merchants;
storing a historical dataset indicating that the first customer ordered from the first merchant; and
dynamically updating the weighted coefficients by inputting values from the historical dataset into the machine learning model.

10. The method of claim 9, further comprising:
receiving a historical dataset comprising customer activity information characterizing one or more historical browsing sessions generated by the first customer at the first customer device,
wherein the historical dataset specifies a first group of merchants that the first customer ordered from and a second group of merchants visited by the first customer;
updating the first customer profile with the customer activity information;
generating a new training dataset of the one or more training datasets, wherein the new training dataset comprises one or more pairings between the updated first customer profile and merchant profiles corresponding to the first group of merchants and the second group of merchants; and
dynamically adjusting the weighted coefficients in the training mode using the new training dataset.

11. The method of claim 9, wherein the set of available merchants are filtered from a global list of merchants based on proximity to a location of the first customer.

12. The method of claim 9, wherein the set of available merchants are filtered from a global list of merchants based on tags corresponding to search terms entered by the first customer at the first customer device.

13. The method of claim 9,
wherein each training customer profile corresponds to a historical customer;
wherein each training merchant profile corresponds to a historical merchant; and
wherein the training set of feature values extracted for each pairing between a training customer profile and a training merchant profile includes a combination of one or more of the following:
an average price range of merchants visited by the historical customer,
an average delivery fee paid by the historical customer,
an average item value of the historical merchant,
an average delivery time of the historical merchant, and
a number of intersecting tags between the training customer profile and the training merchant profile.

14. The method of claim 9, further comprising:
transmitting a request for customer preferences to the first customer device;
receiving a selection of customer preferences from the first customer device;
assigning one or more tags to the first customer profile, the one or more tags corresponding to the selection of customer preferences; and
for each pairing of the first customer profile and an available merchant profile,
generating a secondary order score for the available merchant profile based on an amount of intersecting tags between the first customer profile and the available merchant profile.

15. The method of claim 14, further comprising:
for each pairing of the first customer profile and an available merchant profile,
combining the primary order score and the secondary order score to generate an updated order score for the available merchant profile.

16. The method of claim 15, wherein for each pairing of the first customer profile and an available merchant profile, the primary order score and the secondary order score for the available merchant profile are weighted based on an amount of orders placed by the first customer in a predetermined time period.

17. A server system comprising:
one or more processors configured to cause;
in a training mode:
obtaining one or more training datasets including one or more pairings between a plurality of training customer profiles and a plurality of training merchant profiles; and
for each pairing between a training customer profile and a training merchant profile,
extracting a training set of feature values corresponding to one or more features specified by the training customer profile and the training merchant profile;
converting the training set of feature values into a training vector; and
inputting the training vector and a corresponding known output target into the machine learning model to determine a weighted coefficient for each feature of the one or more features; and
dynamically adjust each weighted coefficient for each training vector and corresponding known output target; and in an inference mode:
receiving a search request from a first customer device corresponding to a first customer, wherein the search request identifies includes a first customer profile corresponding to the first customer;

determining a set of available merchant profiles corresponding to a set of available merchants for the first customer profile;
pairing the first customer profile with each available merchant profile;
for each pairing of the first customer profile and an available merchant profile,
   extracting an input set of feature values corresponding to the one or more features specified by the first customer profile and the available merchant profile;
   generating a primary order score for the available merchant profile based on the input set of feature values and the weighted coefficients;
determining a ranking order for each of the available merchant profiles according to corresponding primary order scores; and
transmitting information pertaining to at least a portion of the set of available merchants to the first customer device for display based on the ranking order; and in an update mode:
   processing an order received from the first customer for at least one item from a first merchant of the portion of the set of available merchants;
   storing a historical dataset indicating that the first customer ordered from the first merchant; and
   dynamically updating the weighted coefficients by inputting values from the historical dataset into the machine learning model.

18. The server system of claim 17, wherein the one or more processors are further configured to:
   receive a historical dataset comprising customer activity information characterizing one or more historical browsing sessions generated by the first customer at the first customer device,
   wherein the historical dataset specifies a first group of merchants that the first customer ordered from and a second group of merchants visited by the first customer;
   update the first customer profile with the customer activity information;
   generate a new training dataset of the one or more training datasets, wherein the new training dataset comprises one or more pairings between the updated first customer profile and merchant profiles corresponding to the first group of merchants and the second group of merchants;
   and dynamically adjust the weighted coefficients using the new training dataset.

19. The server system of claim 17, wherein the set of available merchants are filtered from a global list of merchants based on proximity to a location of the first customer.

20. The server system of claim 17, wherein the set of available merchants are filtered from a global list of merchants based on tags corresponding to search terms entered by the first customer at the first customer device.

* * * * *